United States Patent
Lee et al.

(10) Patent No.: US 10,757,732 B2
(45) Date of Patent: Aug. 25, 2020

(54) METHOD AND APPARATUS FOR COMPETITION-BASED TRANSMITTING OF UPLINK DATA IN WIRELESS COMMUNICATION SYSTEM TO WHICH NON-ORTHOGONAL MULTIPLE ACCESS SCHEME IS APPLIED

(71) Applicant: LG ELECTRONICS INC., Seoul (KR)

(72) Inventors: Hojae Lee, Seoul (KR); Kijun Kim, Seoul (KR); Byounghoon Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/302,082

(22) PCT Filed: Apr. 25, 2017

(86) PCT No.: PCT/KR2017/004351
§ 371 (c)(1),
(2) Date: Nov. 15, 2018

(87) PCT Pub. No.: WO2017/204469
PCT Pub. Date: Nov. 30, 2017

(65) Prior Publication Data
US 2019/0141750 A1    May 9, 2019

Related U.S. Application Data

(60) Provisional application No. 62/340,465, filed on May 23, 2016.

(51) Int. Cl.
*H04W 74/08* (2009.01)
*H04W 74/00* (2009.01)
*H04J 99/00* (2009.01)

(52) U.S. Cl.
CPC ....... *H04W 74/08* (2013.01); *H04W 74/0816* (2013.01); *H04J 15/00* (2013.01); *H04W 74/006* (2013.01)

(58) Field of Classification Search
CPC ............. H04W 74/08; H04W 74/0816; H04W 74/006; H04W 72/04; H04W 72/12;
(Continued)

(56) References Cited

U.S. PATENT DOCUMENTS 8,929,319 B2 * 1/2015 Anderson ......... H04W 72/1284
370/329
2015/0139120 A1    5/2015 ElArabawy et al.
(Continued)

FOREIGN PATENT DOCUMENTS

| KR | 20110117012 | 10/2011 |
| KR | 20130028741 | 3/2013 |
| WO | 2008082908 | 7/2008 |

OTHER PUBLICATIONS

PCT International Application No. PCT/KR2017/004351, International Search Report dated Jul. 18, 2017, 4 pages.
(Continued)

*Primary Examiner* — Sharad Rampuria
(74) *Attorney, Agent, or Firm* — Lee Hong Degerman Kang Waimey

(57) ABSTRACT

Provided are a method and an apparatus for competition-based transmitting of uplink data in a wireless communication system to which a non-orthogonal multiple access scheme is applied. Particularly, a UE receives, from a base station, information relating to a contention zone. The information relating to the contention zone includes predefined contention zone patterns and predefined terminal classes. The terminal selects a terminal class for the terminal from among the predefined terminal classes. The terminal selects a contention zone pattern for the terminal from among the
(Continued)

Fractional Timing Distance Zone

Pre-defined Resource Zone predefined contention zone patterns on the basis of the selected terminal class. The uplink data is transmitted to the base station through a plurality of contention zones included in the selected contention zone pattern.

12 Claims, 24 Drawing Sheets

(58) Field of Classification Search
CPC . H04W 76/00; H04J 15/00; H04J 2203/0069; H04B 7/2121; H04B 7/2123; H04Q 2213/394
See application file for complete search history.

(56) References Cited

U.S. PATENT DOCUMENTS

| | | | |
|---|---|---|---|
| 2016/0119096 A1 | 4/2016 | Sun et al. | |
| 2016/0119807 A1 | 4/2016 | Sun et al. | |
| 2016/0127092 A1* | 5/2016 | Zhang | H04L 5/0048 370/329 |
| 2016/0241325 A1* | 8/2016 | Raghothaman | H04W 36/00 |
| 2017/0013599 A1 | 1/2017 | Sun et al. | |
| 2017/0215179 A1* | 7/2017 | Choi | H04L 1/0026 |
| 2017/0331662 A1 | 11/2017 | Sun et al. | |
| 2018/0103465 A1* | 4/2018 | Agiwal | H04W 74/004 |
| 2018/0175968 A1 | 6/2018 | Shin et al. | |

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN), Overall description Stage 2 (Release 13)," 3GPP TS 36.300 V13.3.0, Mar. 2016, 297 pages.

United States Patent and Trademark Office U.S. Appl. No. 16/302,073, Office Action dated Apr. 9, 2020, 24 pages.

* cited by examiner

METHOD AND APPARATUS FOR COMPETITION-BASED TRANSMITTING OF UPLINK DATA IN WIRELESS COMMUNICATION SYSTEM TO WHICH NON-ORTHOGONAL MULTIPLE ACCESS SCHEME IS APPLIED

CROSS-REFERENCE TO RELATED APPLICATIONS

This application is the National Stage filing under 35 U.S.C. 371 of International Application No. PCT/KR2017/004351, filed on Apr. 25, 2017, which claims the benefit of U.S. Provisional Application No. 62/340,465, filed on May 23, 2016, the contents of which are all hereby incorporated by reference herein in their entirety.

BACKGROUND OF THE INVENTION

Field of the Invention

The present specification relates to wireless communication, and more particularly, to a method and apparatus for contention-based transmission of uplink data in a wireless communication system to which a non-orthogonal multiple access scheme is applied.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY OF THE INVENTION

The present specification proposes a method and apparatus for contention-based transmission of uplink data in a wireless communication system to which a non-orthogonal multiple access scheme is applied.

The present specification proposes a method and apparatus for contention-based transmission of uplink data in a wireless communication system to which a non-orthogonal multiple access scheme is applied.

The apparatus includes a radio frequency (RF) unit transmitting and receiving a radio signal, and a processor operatively coupled to the RF unit.

The present embodiment shows uplink communication between a base station (BS) and a specific user equipment (UE) in a wireless communication system to which a non-orthogonal multiple access scheme is applied.

First, terminologies will be summarized. A contention zone may correspond to a resource region for contention-based uplink connection or uplink data transmission on the basis of the non-orthogonal multiple access scheme.

The UE receives information regarding a contention zone from the BS. The information regarding the contention zone includes a pre-defined contention zone pattern and a pre-defined UE class.

The pre-defined contention zone pattern and the pre-defined UE class may be agreed in advance between the BS and the UE. The pre-defined contention zone pattern and the pre-defined UE class are broadcast to all UEs in a cell in a look up table form. Upon receiving the information, the UE attempts to perform non-orthogonal multiple access to the BS.

The pre-defined contention zone pattern may be selected based on the pre-defined UE class. The UE class may correspond to a UE group which performs contention-based transmission on the basis of a specific pattern for the contention zone. Therefore, the UE class and the contention zone pattern may be related to each other. In addition, the pre-defined contention zone pattern may be signaled through a common control zone, a radio resource control (RRC), or a higher layer.

The UE selects a UE class for the UE from among the pre-defined UE classes. That is, the UE selects a specific UE class from among the pre-defined UE classes by considering whether the UE requires SNR gathering or requires to obtain frequency diversity.

The UE selects the contention zone pattern for the UE from among the pre-defined contention zone patterns on the basis of the selected UE class. For example, if the UE has selected the UE class for SNR gathering, the UE selects a pattern including a contention zone repeated or spread in a time domain to obtain an SNR gain. In addition, if the UE has selected the UE class to obtain frequency diversity, the UE selects a pattern including a contention zone repeated or spread in a frequency domain.

The UE transmits uplink data to the BS through a plurality of contention zones included in the selected contention zone pattern.

The contention zone includes a single contention zone which uses only one contention zone, multiple contention zones (a plurality of contention zones) which use two or more contention zones, or a variable contention zone in which a location and count of the contention zone varies. Herein, however, it is assumed that a contention-based procedure is performed by using the multiple contention zones. The multiple contention zones mean that information to be transmitted on a contention based manner is transmitted by being repeated or spread through two or more contention zones.

In other words, the plurality of contention zones may be generated by allowing one contention zone included in the selected contention zone pattern to be repeated or spread in a frequency domain. Alternatively, the plurality of contention zones may be generated by allowing one contention zone included in the selected contention zone pattern to be repeated or spread in a time domain.

In addition, if reliability of uplink data cannot be secured with one contention zone included in the selected contention zone pattern, the uplink data may be transmitted through the plurality of contention zones. That is, if the UE cannot achieve UL coverage only with the single contention zone, the UE may transmit contention-based data by using the plurality of contention zones.

In addition, the UE may receive system information indicating the common control zone from the BS. The system information and information regarding the contention zone may be received through the common control zone. That is, the system information may also be broadcast to all UEs in a cell.

In addition, it may be assumed that the UE and the BS perform a contention-based procedure by using the variable contention zone. In this case, a location, count, and period of the contention zone may be changed depending on a success rate of multi-user detection (MUD) and a collision ratio of a contention zone included in the pre-defined contention zone pattern. The location, count, and period of the changed contention zone may be broadcast through the common control zone.

In addition, capability of the contention zone may be considered. The capability of the contention zone included in the pre-defined contention zone pattern may indicate the maximum number of pre-defined codewords. The capability of the contention zone may be broadcast through the common control zone. The maximum number of pre-defined codewords may vary depending on a collision ratio of the contention zone. In this case, the UE may randomly select a codeword for the UE from among the pre-defined codewords.

Information on the capability of the contention zone (capability field, capability level, and codebook index) may be broadcast in a look up table form, and the UE may recognize a codebook which can be used by the UE. When the number of codewords is great, the number of cases which can be selected by the UE increase, and thus a collision ratio may decrease.

For example, when a probability of collision occurrence is low, the number of codewords needs to be decreased to reduce an amount of interference which occurs between codewords. Therefore, the UE may select a codeword from among codebook indices of which the maximum number of selectable codewords is small. When the probability of collision occurrence is high, the number of required codewords is great. Therefore, the UE may select a codeword from among codebook indices of which the maximum number of selectable codewords is great.

In addition, the plurality of contention zones may be subjected to code division multiplexing (CDM) in the same contention zone. The plurality of contention zones may be subjected to multi-user access by using not only time division multiplexing and frequency division multiplexing but also code division multiplexing.

By using the proposed scheme, when a UE cannot achieve UL coverage only with a single contention zone, data can be transmitted to multiple contention zones by achieving an SNR gain with repetition or spreading in a time domain or by obtaining frequency diversity with repetition or spreading in a frequency domain. Therefore, since collision for multiple contention zones occurs partially, there is an advantage in log-likelihood ratio (LLR) calculation when transmission information of multiple users of a receiver is combined. In addition, reliability of data transmission can be improved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
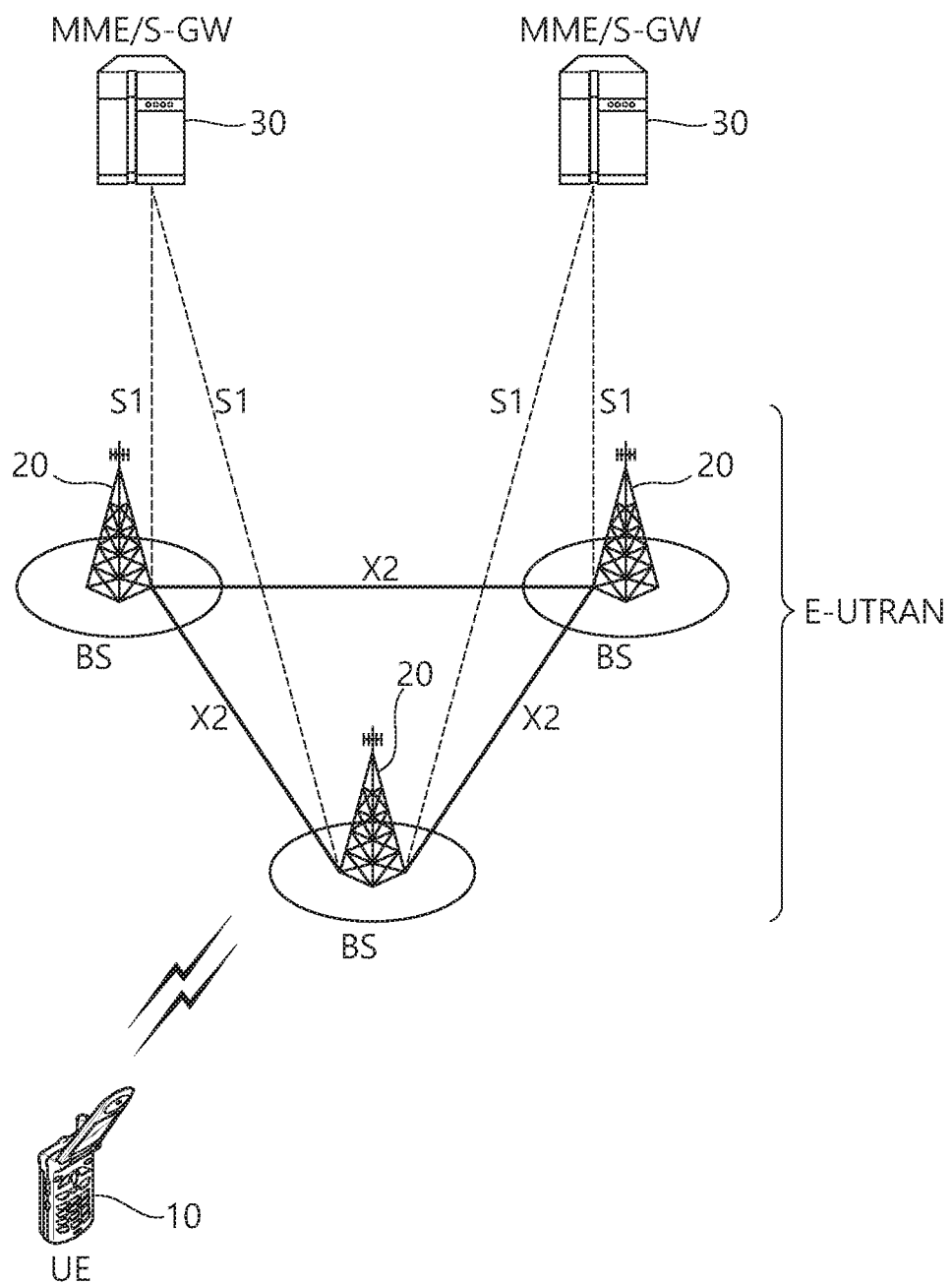
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
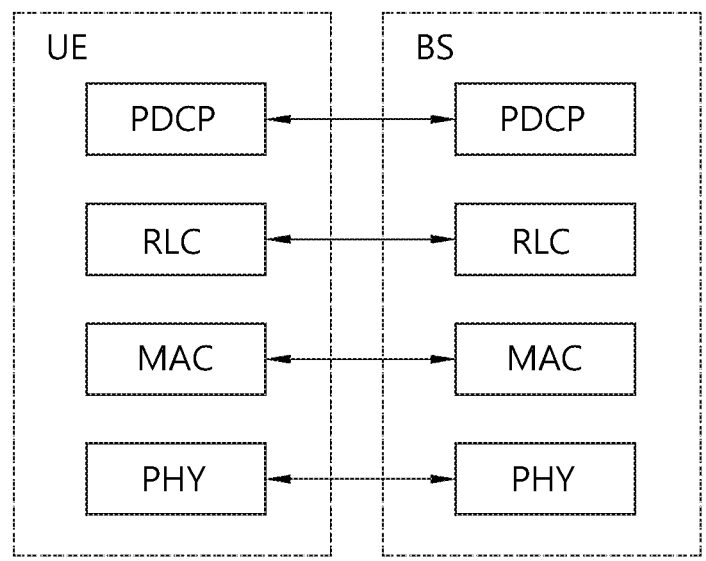
FIG. 2 is a diagram illustrating a radio protocol architecture for a user plane.
Figure 3:
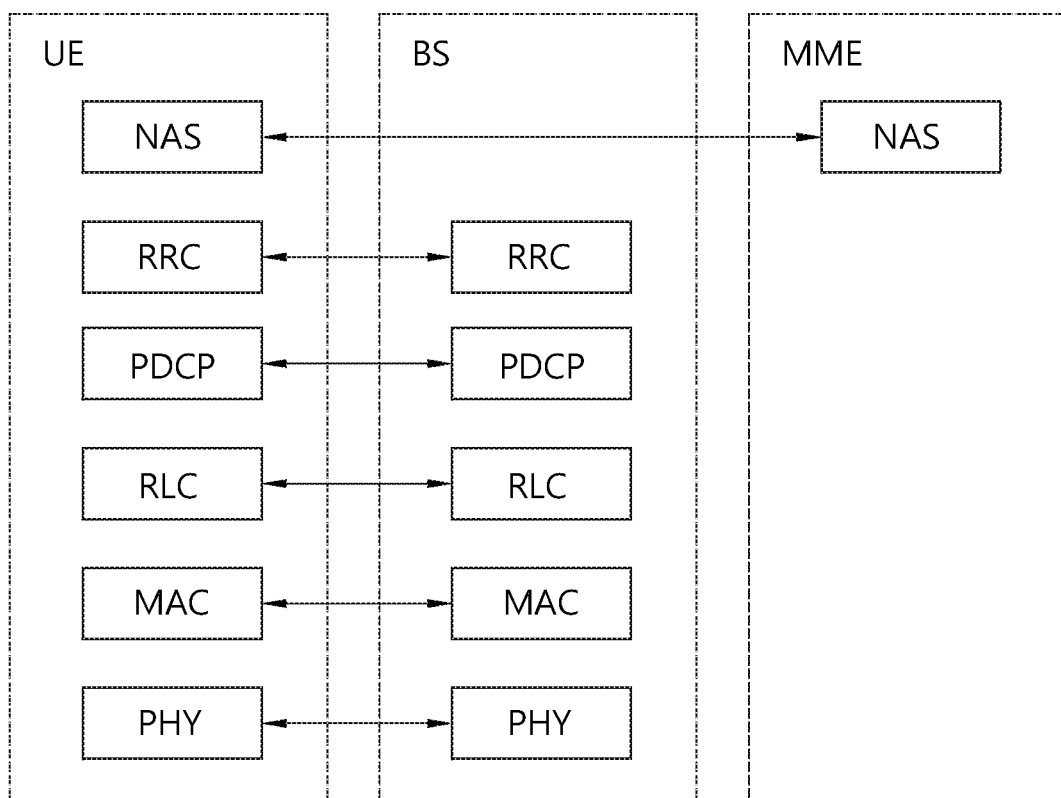
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
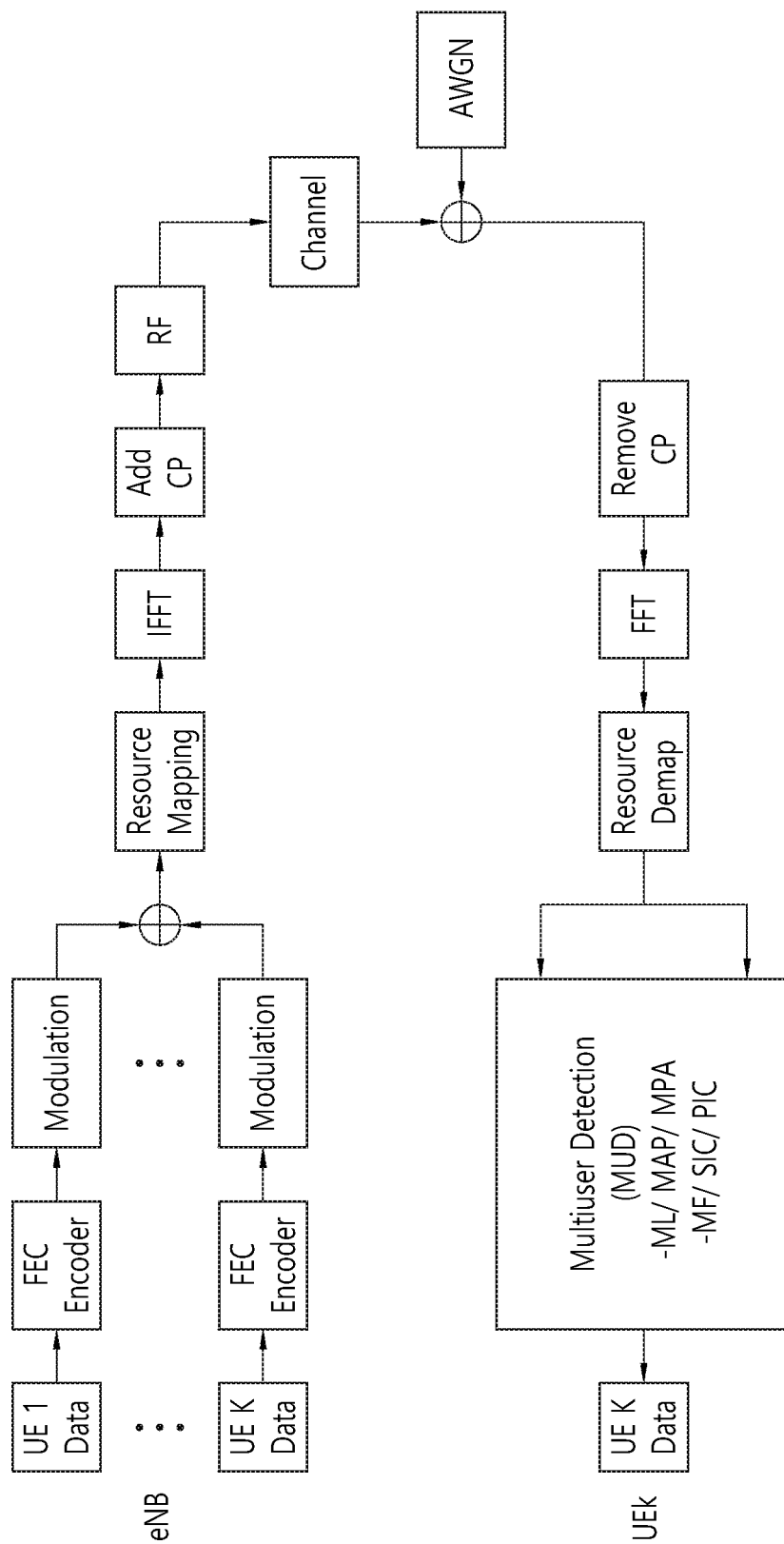
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
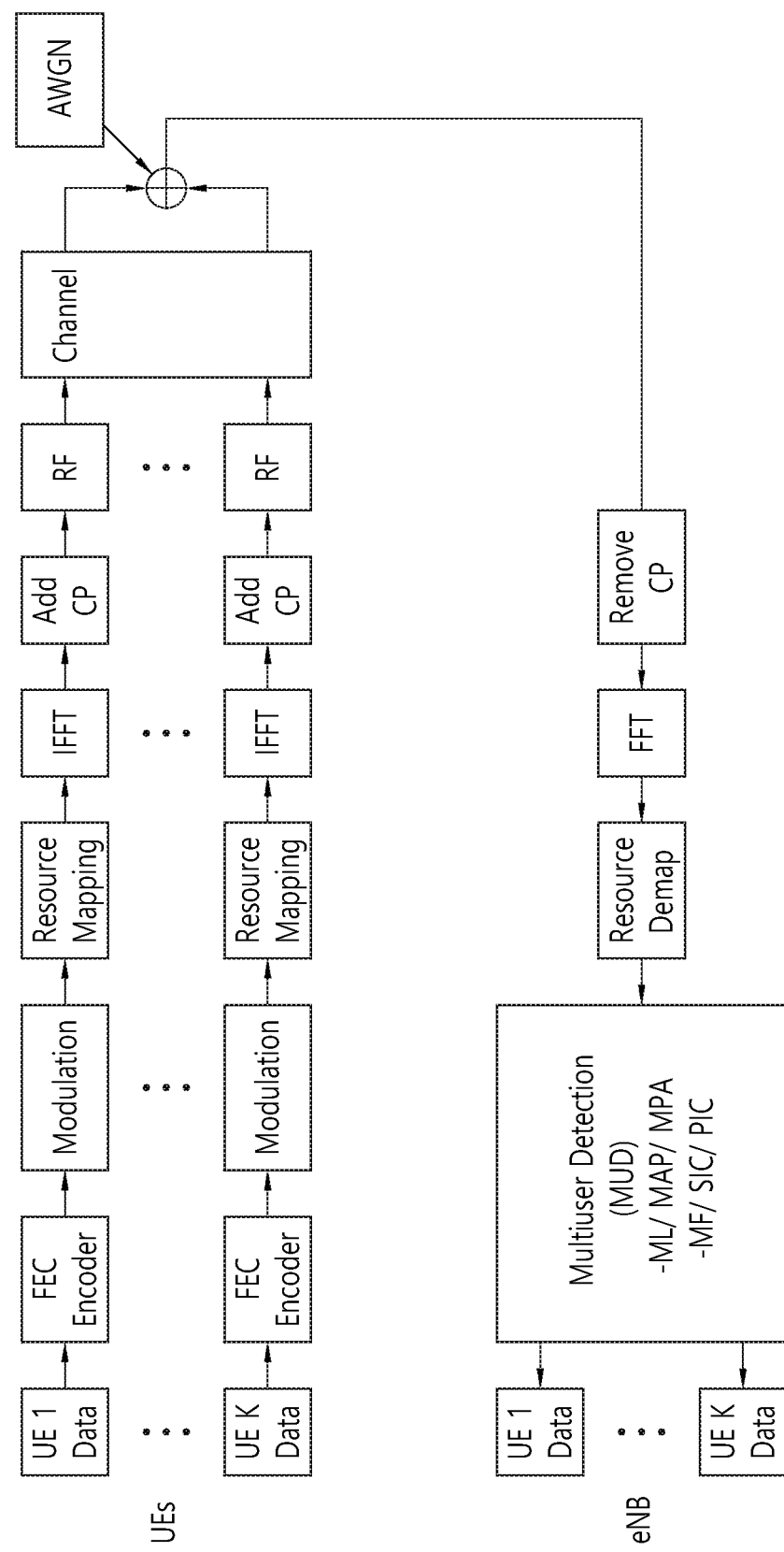
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{|\sum_{n \neq k, n=1}^{K} h_k s_n|^2 + \sigma_k}\right) =$$

$$\log_2\left(1 + \frac{\text{Channel Gain}}{MUI + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 6:
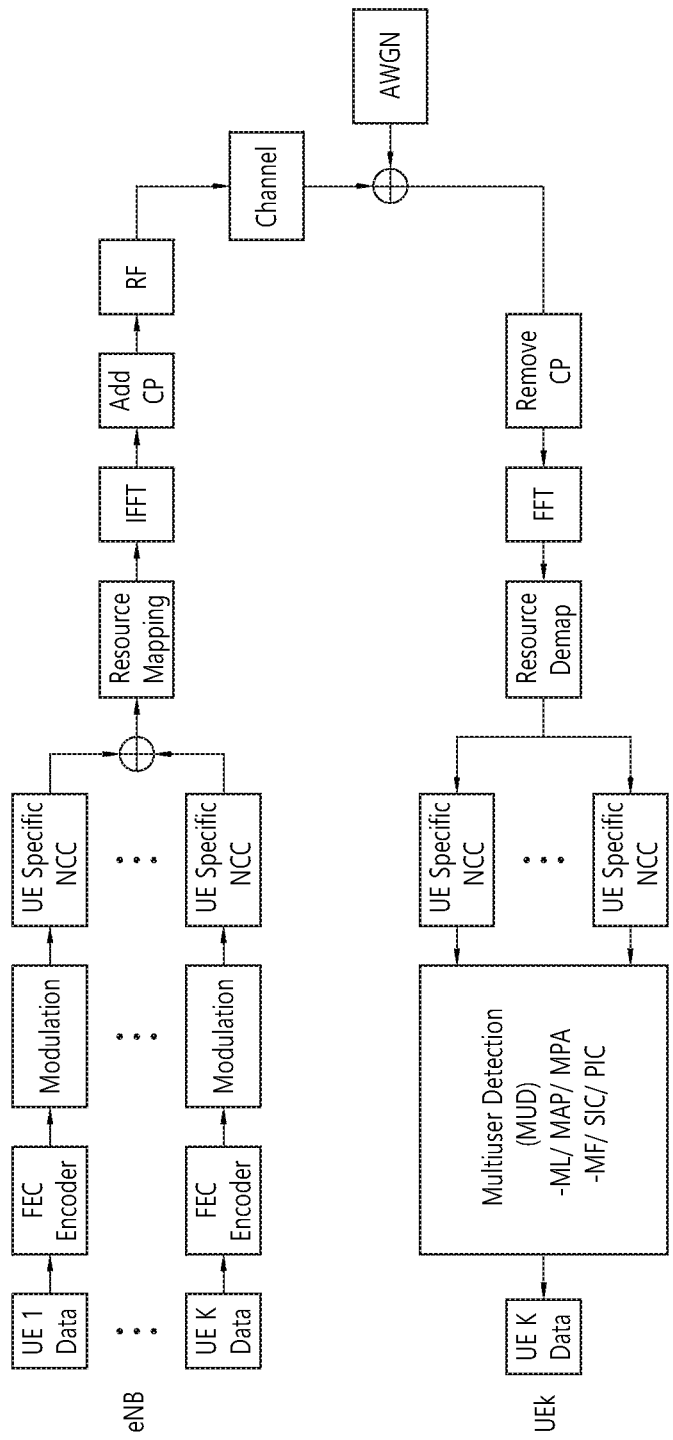
FIG. 6 is a block diagram illustrating NCMA based downlink transmission/reception (Tx/Rx) of a communication apparatus.
Figure 7:
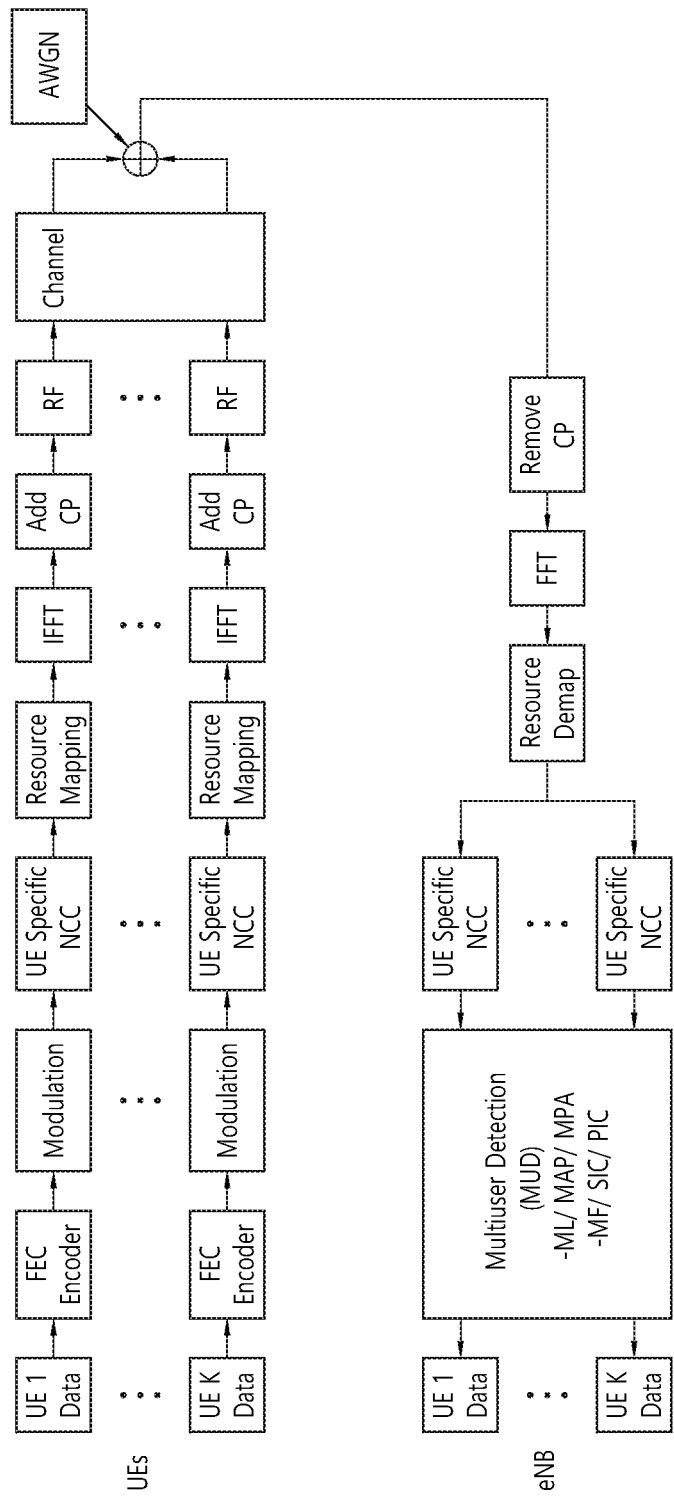
FIG. 7 is a block diagram illustrating NCMA based uplink transmission/reception (Tx/Rx) of a communication apparatus.

FIG. 6 is a block diagram illustrating NCMA based downlink transmission/reception (Tx/Rx) of a communication apparatus, and FIG. 7 is a block diagram illustrating NCMA based uplink transmission/reception (Tx/Rx) of a communication apparatus.

The present invention suggests an NCMA scheme that minimizes multi-UE interference when data of multi-UE are transmitted to the same time-frequency resource through superposition. FIGS. 6 and 7 illustrate downlink and uplink transmitter and receiver structures of the NCMA system that performs superposition transmission by using UE specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [c^{(1)} \ldots c^{(K)}] = \begin{bmatrix} c_1^{(1)} & \cdots & c_1^{(K)} \\ \vdots & \ddots & \vdots \\ c_N^{(1)} & \cdots & c_N^{(K)} \end{bmatrix} \quad \text{[Equation 3]}$$

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $$\min_C (\max_{1 \leq k < j \leq K} \sqrt{1 - |c^{(k)*} \cdot c^{(j)}|^2}), C \subset \mathbb{C}^{N \times K}.$$

The UE-specific NCC has features as expressed by the following Equation 4.

$$\begin{cases} |c^{(k)*} \cdot c^{(k)}| = 1, \forall k, k = 1, \ldots, K, \\ \text{if } N > K, |c^{(k)*} \cdot c^{(j)}| = \delta, \forall k, \forall j, k = 1, \ldots, K, j = 1, \ldots, K, \\ \text{if } N \leq K, |c^{(k)*} \cdot c^{(j)}| = 0, \forall k, \forall j, k = 1, \ldots, K, j = 1, \ldots, K. \end{cases} \quad \text{[Equation 4]}$$

In this case, $c^{(k)*}$ is a conjugate codeword of c(k). The features of the Equation 4 are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,K} \geq \sqrt{1 - \frac{(N-1)K}{N(K-1)}}$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

TABLE 1

| # of codewords (Max. # of users: K) | Examples of spreading codebook $c^{(1)} \ldots c^{(K)}$ |
|---|---|
| 2 | $\begin{bmatrix} 1 & 1 \\ 1 & -1 \end{bmatrix}$ |
| 3 | $\begin{bmatrix} -0.5078 - 0.2451i & -0.8055 + 0.5684i & -0.1483 - 04194i \\ 0.5640 - 0.6034i & 0.1640 + 0.0357i & -0.8751 - 0.1904i \end{bmatrix}$ |
| 4 | $\begin{bmatrix} -0.4907 - 0.7256i & -0.6440 - 0.5906i & -0.1657 + 0.2160i & -0.5775 - 0.2480i \\ 0.4510 + 0.1709i & -0.4452 + 0.1956i & 0.9349 - 0.2279i & -0.3586 - 0.6902i \end{bmatrix}$ |

Table 2 illustrates a codebook in case of Spreading Factor N=4.

Various values may be obtained using mathematical equation or algorithm in addition to the above Tables 1 and 2.

TABLE 2

| # of codewords (Max. # of users: K) | Examples of spreading codebook $c^{(1)} \ldots c^{(K)}$ |
|---|---|
| 4 | $\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 6 | $\begin{bmatrix} -0.0557 - 0.4476i & -0.1684 - 0.8131i & -0.0149 + 0.2205i & \ldots \\ & -0.0198 - 0.1206i & -0.3294 - 0.3689i & -0.0487 + 0.4148i \\ 0.4023 - 0.1460i & -0.4021 + 0.2118i & -0.6703 + 0.0282i & \ldots \\ & -0.6521 + 0.4251i & -0.0729 - 0.0903i & -0.2158 - 0.3003i \\ -0.1499 - 0.3961i & 0.0471 - 0.2647i & 0.3131 - 0.5204i & \ldots \\ & -0.5576 - 0.0206i & 0.6726 - 0.0552i & 0.0357 + 0.0924i \\ 0.5675 + 0.3346i & -0.0866 + 0.1557i & -0.0287 + 0.3624i & \ldots \\ & -0.0286 + 0.2589i & 0.4567 - 0.2792i & 0.6985 + 0.4372i \end{bmatrix}$ |
| 8 | $\begin{bmatrix} -0.2381 - 0.8369i & -0.6599 - 0.1222i & -0.6557 - 0.1776i & -0.1561 + 0.0861i & \ldots \\ & -0.1374 + 0.1275i & -0.1847 + 0.3859i & -0.2426 - 0.2248i & -0.1703 - 0.0604i \\ -0.2593 - 0.3320i & 0.4906 + 0.0221i & 0.3934 + 0.2749i & -0.3453 - 0.2068i & \ldots \\ & -05596 + 0.0272i & 0.0616 + 0.0315i & -0.3027 - 0.3133i & -07664 + 0.1256i \\ -0.1249 + 0.0320i & 0.0425 + 0.3856i & 0.0440 - 0.3295i & -0.3979 + 0.0525i & \ldots \\ & -0.5272 - 0.2195i & 0.0649 - 0.8770i & -0.2452 + 0.4427i & -0.049 - 0.4727i \\ -0.2180 - 0.0342i & 0.3968 - 0.0250i & -0.3444 - 0.2811i & -0.7817 - 0.1845i & \ldots \\ & 0.2417 + 0.5162i & 0.1956 + 0.0203i & 0.4625 - 0.4805i & 0.0794 - 0.3663i \end{bmatrix}$ |

Figure 8:
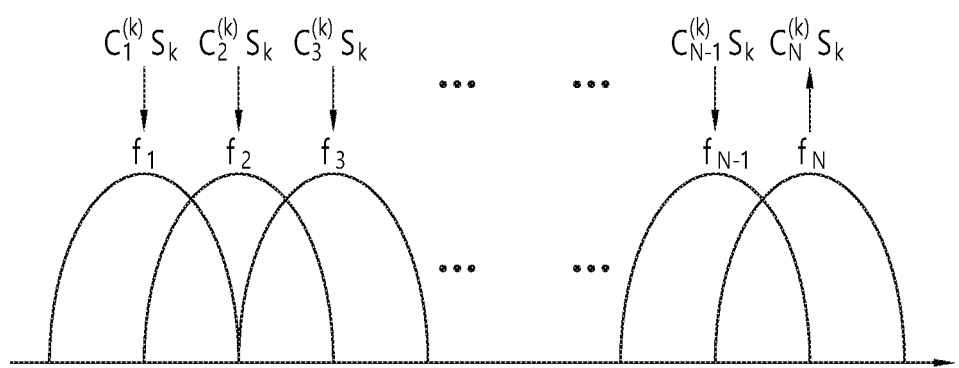
FIG. 8 is a conceptual diagram illustrating a frequency axis of data transmission according to UE-specific NCC.

FIG. 8 is a conceptual diagram illustrating a frequency axis of data transmission according to UE-specific NCC.

FIG. 8 illustrates a concept that a transmitter (or transmitting side) transmits kth UE data on a frequency axis through UE-specific NCC. When UE-specific NCC defined by Grassmaniann line packing is previously scheduled by the transmitter and the receiver, data for the kth UE is multiplied by a codeword corresponding to the kth UE. At this time, one data symbol sk corresponds to a codeword vector $c^{(k)}$ of (N×1) dimension. Then, N elements of the codeword correspond to N subcarriers.

That is, in FIG. 8, since one data symbol is transmitted to N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 9:
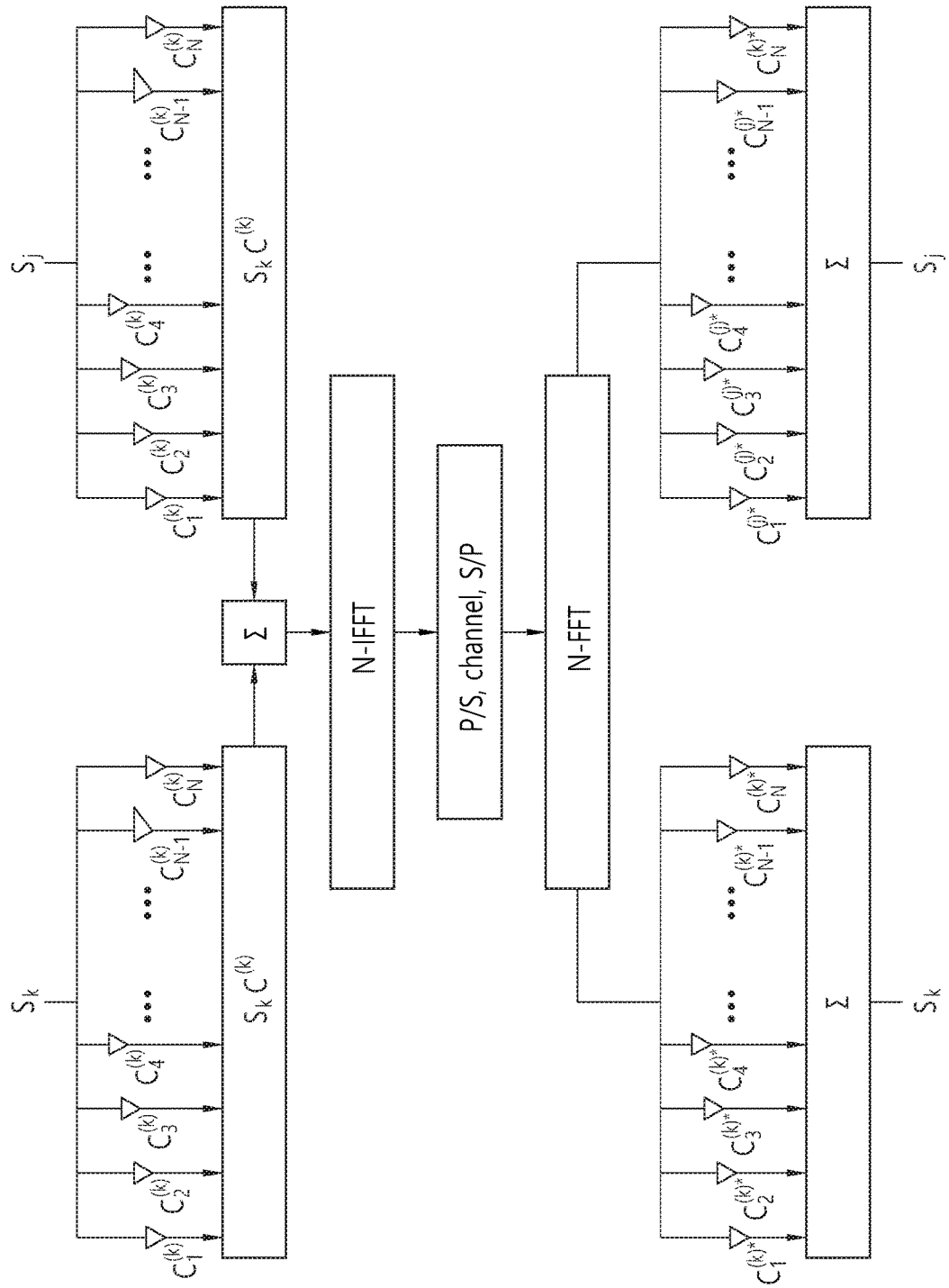
FIG. 9 is a structural diagram illustrating basic transmission and reception of NCMA system.

FIG. 9 is a structural diagram illustrating basic transmission and reception of NCMA system.

FIG. 9 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k, \quad \text{[Equation 5]}$$

$$\hat{y}_k = \left[\frac{[y_k]_j}{[H_k]_{j,j}}\right]_{j=1,\ldots,N} = \sum_{n=1}^{K} c^{(n)} s_n + \hat{n}_k,$$

In the above Equation 5, $H_k$ means (N×N) channel matrix from the kth transmitter to the receiver, and includes frequency-axis channel coefficients as a diagonal matrix. $c^{(k)}$ is (N×1) UE-specific NCC vector for the receiver at the kth transmitter, $s_k$ is a data symbol to the kth receiver, and n means (N×1) signal noise vector. K is the number of multi-UEs allocated to the same time-frequency resource. In this case, $$\left[\frac{[A]_j}{[B]_{j,j}}\right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k, \quad \text{[Equation 6]}$$

$$= s_k + \sum_{n \neq k, n=1}^{K} c^{(k)*} \cdot c^{(n)} \cdot s_n + \tilde{n}_k.$$

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n, \quad \text{[Equation 7]}$$

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k = \quad \text{[Equation 8]}$$

$$\left[\frac{[y]_j}{[H_k]_{j,j}}\right]_{j=1,\ldots,N} = c^{(k)} s_k + \sum_{n=1}^{K} \left[\frac{[H_n]_{j,j}}{[H_k]_{j,j}}\right]_{j=1,\ldots,N} c^{(n)} s_n + \hat{n},$$

A signal of desired codewords, MUI, and noise remain through channel compensation for the kth UE data, and are detected as expressed by the following Equation 9 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot \quad \text{[Equation 9]}$$

$$\left[\frac{[H_n]_{j,j}}{[H_k]_{j,j}}\right]_{j=1,\ldots,N} c^{(n)} s_n + \tilde{n},$$

$$= s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} \cdot s_n + \tilde{n}.$$

In the above Equation 9, the second item of the last column indicates MUI, and may be removed or reduced through the MUD scheme. At this time, frequency-axis channel change of $$\left[\frac{[H_n]_{j,j}}{[H_k]_{j,j}}\right]_{j=1,\ldots,N}$$

causes a change of MUI value when MUD according to UE-specific NCC is performed due to a change of a channel environment from the multi-UE. For convenience of description, a single tranmitting and receivng antennas is provided, it will be apparent that the same scheme is applied to even an environment where multiple antennas are used.

According to the description related to the aforementioned NCMA scheme, it is possible to achieve higher frequency usage efficiency or more massive connectivity in accordance with the number of superposed UEs while controlling MUI according to multi-UE data superposition transmission.

The present specification proposes a contention-based multiple access (MA) scheme. The proposed scheme includes an operating scheme based on hierarchical coding and modulation in the contention-based MA. Hereinafter, the contention-based MA scheme will be described.

Figure 10:
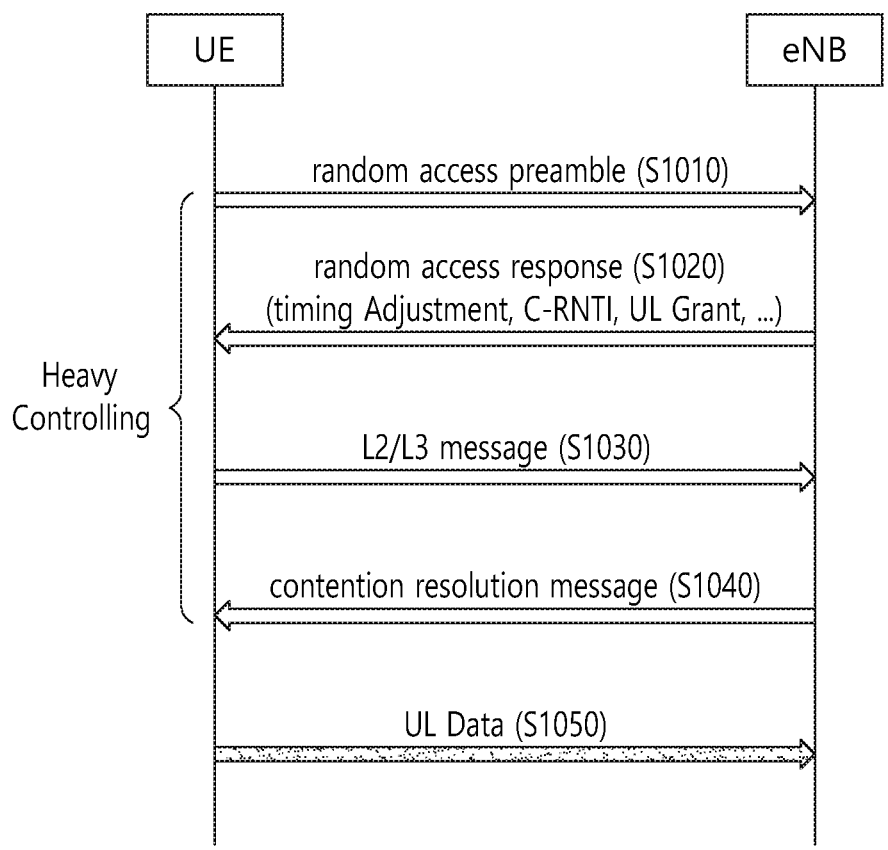
FIG. 10 shows a contention-based random access procedure in an LTE system.

FIG. 10 shows a contention-based random access procedure in an LTE system.

In a wireless communication system, the contention-based MA scheme shown in FIG. 10 is a typical technique. An uplink access scheme in an LTE communication system is shown in FIG. 10. In addition, the access scheme may be used in an ad-hoc network such as device to device (D2D) or vehicular to everything (V2X) and a cellular-based scheme such as LTE-advanced (LTE-A) or machine type communication (MTC).

The contention-based MA scheme starts when a scheduling request (SR) is performed from a UE to an eNB (S1010), and scheduling information of the eNB is received (S1020). Scheduling information received from the eNB includes timing adjustment or timing advance (TA) for synchronization between signals received from multiple users, a cell, ID, and a grant (e.g., it is transmitted through a PDCCH as control information including MCS level information or resource allocation information) for uplink access. In general, a communication system is a communication system in which limited radio resources are used by multiple UEs. However, since one UE cannot know a state of another UE, there may be a case where the multiple UEs request for resource allocation with respect to the same resource. Accordingly, the eNB resolves collision of resources requested by the multiple UEs in one contention, and transmits information thereof (S1040). In addition, the eNB and the UE transmit uplink data by exchanging control information for network access and HARQ (S1030).

Figure 11:
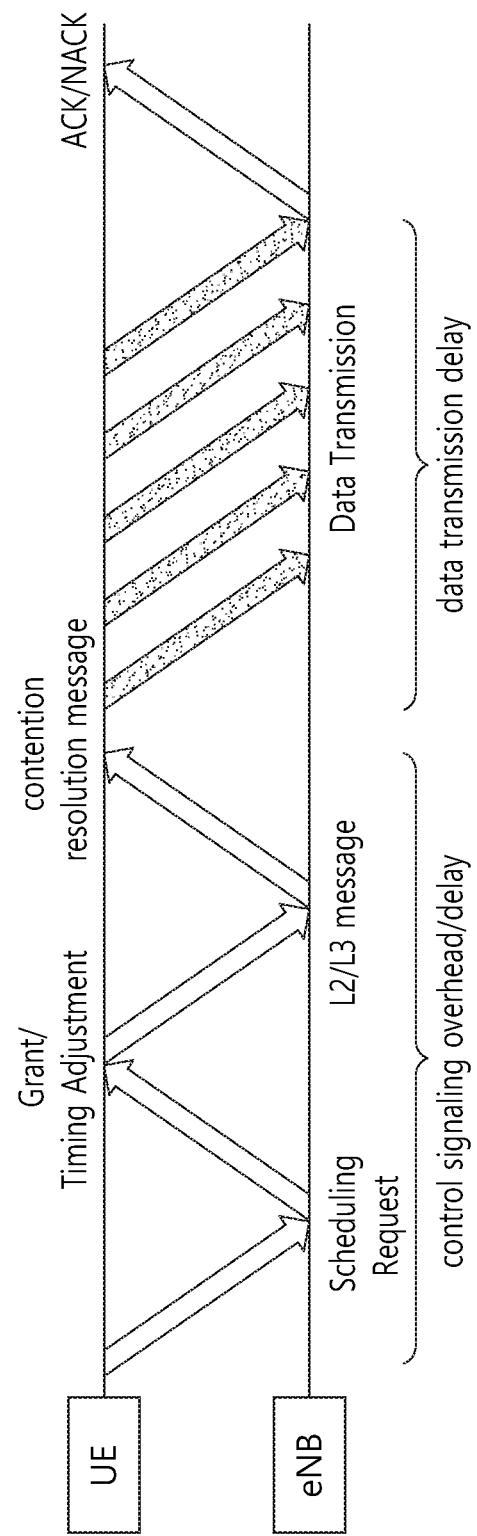
FIG. 11 shows a delay of control signaling and a delay of data transmission according to an uplink processing procedure in an LTE system.

FIG. 11 shows a delay of control signaling and a delay of data transmission according to an uplink processing procedure in an LTE system.

V2X, emergency service, machine control, or the like targeting an ultra-low latency service (ULLS) is considered in a next-generation wireless communication system. The ULLS has a very limited end-to-end (E2E) latency requirement and requires a high data rate. For example, E2E Latency<1 ms, DL Data Rate: 50 Mbps, UL Data Rate: 25 Mbps. In general, the E2E latency is determined by a network delay, a processing delay, and an air interface delay. The legacy contention-based multiple access scheme essentially requires heavy controlling as shown in FIG. 4, and thus has a long air interface delay. A delay of control signaling and a delay of data transmission are shown in FIG. 11 according to an uplink processing procedure of the legacy LTE system. Therefore, there is a need for a scheme capable of simplifying a control procedure for ULLS and effectively resolving contention, and a multiple access scheme capable of increasing a data transfer rate.

Accordingly, a scheme capable of simplifying a control procedure and resolving contention and a multiple access scheme and resource allocation scheme capable of increasing a data transfer rate are proposed for a low latency service of the next-generation wireless communication system.

In order to achieve the ULLS, a multiple access control scheme is proposed in which a control signaling procedure for multiple access is simplified and immediate data transmission of a UE is ensured.

In particular, in order to ensure the service, it is necessary to achieve: 1) a decrease in initial control signaling (timing advance (TA) and grant reception or the like) for UL transmission; and 2) a decrease in reception time of ACK/NACK for data transmission. A technique for enabling asynchronous control for multi-user transmission occurring when TA is not performed and uplink transmission without reception of an SR and a grant is proposed to achieve the condition 1). In addition, a technique for minimizing a traffic transfer completion time point of the UE is proposed to achieve the condition 2).

Method 1: Asynchronous Multiple Access Based on Control Signaling Reduction for Ultra-Low Latency In order to achieve the condition 1), it is assumed that each UE performs data transmission immediately without performing TA and scheduling from an eNB upon traffic generation based on data transmission. From a receiving eNB perspective, there may be a problem in that data reception of multiple users is not synchronized and a problem in that collision occurs between data of multiple users. Even if a multiple access scheme (e.g., Interleave Division Multiple Access (IDMA) or Sparse Code Multiple Access (SCMA), Power Level Non-Orthogonal Multiple Access (NOMA)) robust to an asynchronous property and data collision of multiple users is used, asynchronous data between multiple users at a receiver may make it difficult to distinguish between users and may be a cause of reducing a data decoding rate. Accordingly, there is a need for a multiple access scheme for asynchronous control.

The method 1 proposes a scheme of resolving an asynchronous problem between multiple users, which occurs due to a decrease in control signaling for supporting ULLS. When performing uplink transmission, UEs resolve the asynchronous problem, which occurs when initial control signaling is not performed, through pre-defined implicit timing. When traffic is generated based on uplink data transmission, the UEs provide asynchronous control by performing symbol-based synchronization from a transmission perspective through pre-defined periodic timing. In addition, a timing offset from a reception perspective is controlled to be within a cyclic prefix (CP) by performing user-grouping on UEs having a similar propagation delay time and by allocating the same resource zone. The user grouping is performed by an eNB according to a pre-defined timing distance, and the resource zone is allocated in advance to each user group. In this case, uplink data collision of synchronized UEs is identified through multi-user detection (MUD).

When the proposed method is used, synchronized uplink data can be transmitted without a TA and a grant, and uplink data collision occurring in this case can be identified through MUD.

For example, a pre-defined implicit timing scheme for asynchronous control is proposed. This may correspond to a method of removing a timing offset from a transmission perspective.

Figure 12:
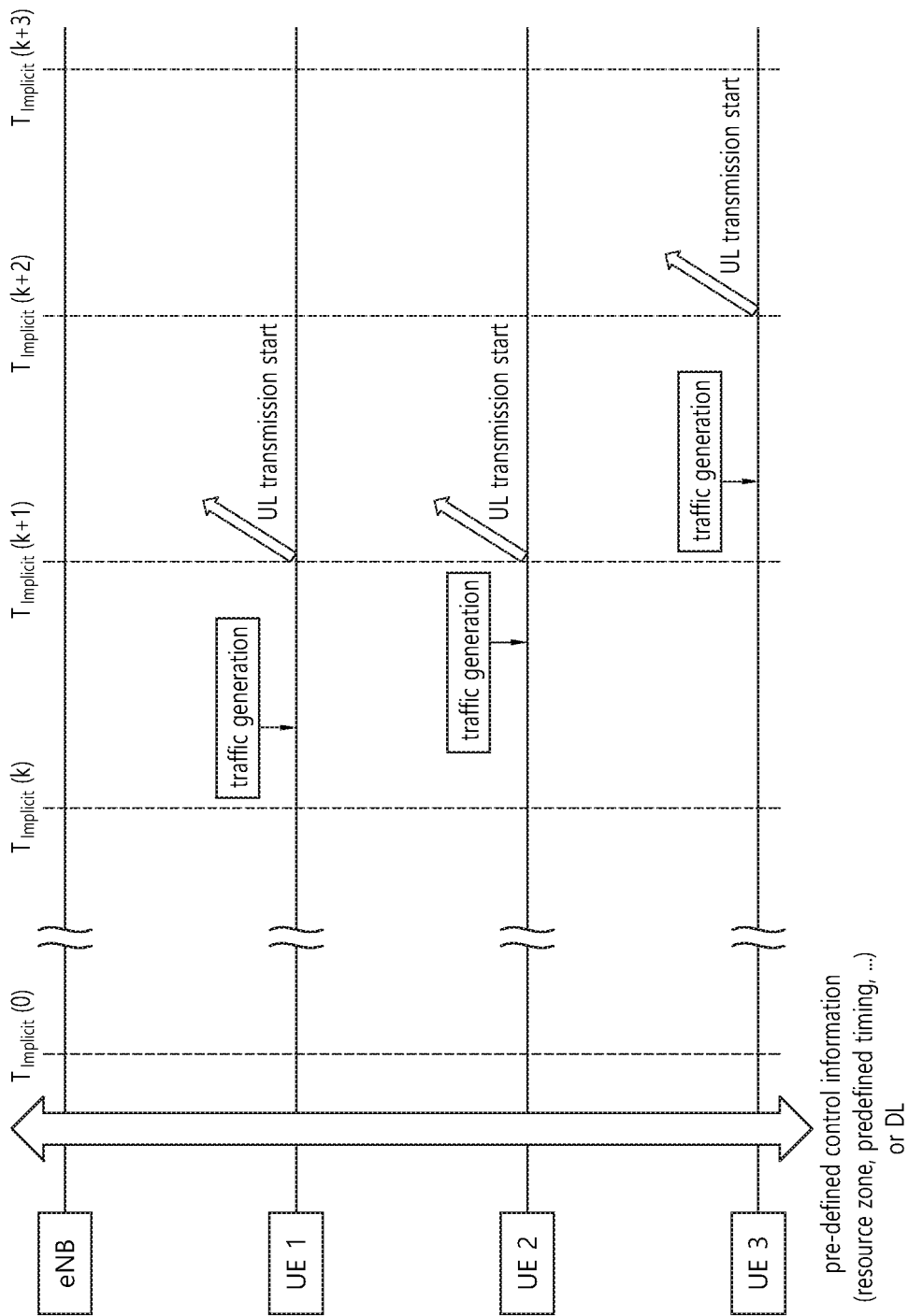
FIG. 12 shows an example of an asynchronous control operation through a pre-defined implicit timing scheme.

FIG. 12 shows an example of an asynchronous control operation through a pre-defined implicit timing scheme.

Referring to FIG. 12, it is assumed that an eNB and each UE (i.e., UE 1, UE 2, and UE 3) share pre-defined timing Pre-defined implicit timing is defined as a symbol unit, and a period thereof may differ depending on a symbol duration of a system environment. In this case, the pre-defined implicit timing indicates periodicity, and a period thereof may be defined variously such as a symbol, a sub-frame, a frame, or the like. A UE which requires immediate data transmission transmits information regarding pre-defined implicit timing which is closest from a time point thereof. Herein, the pre-defined implicit timing may be agreed from downlink synchronization, or may be agreed as absolute time in advance through pre-defined control information between the eNB and all UEs. However, the pre-defined implicit timing may be defined as $T_{Implicit}(N)=T+T_{symbol}*N$ on the basis of an absolute time reference T. Herein, $N=0, \ldots, \infty$. $T_{symbol}$ may be a symbol length, sub-frame length, or frame length including a CP length.

For example, as shown in FIG. 12, when traffic of the UE 1 and the UE 2 is generated between $T_{Implicit}(k)$ and $T_{Implicit}(k+1)$, uplink transmission starts at the closest pre-defined implicit timing $T_{Implicit}(k+1)$. Likewise, in case of the UE 3, when traffic is generated between $T_{Implicit}(k+1)$ and $T_{Implicit}(k+2)$, uplink transmission starts at the closest pre-defined implicit timing $T_{Implicit}(k+2)$.

Figure 13:
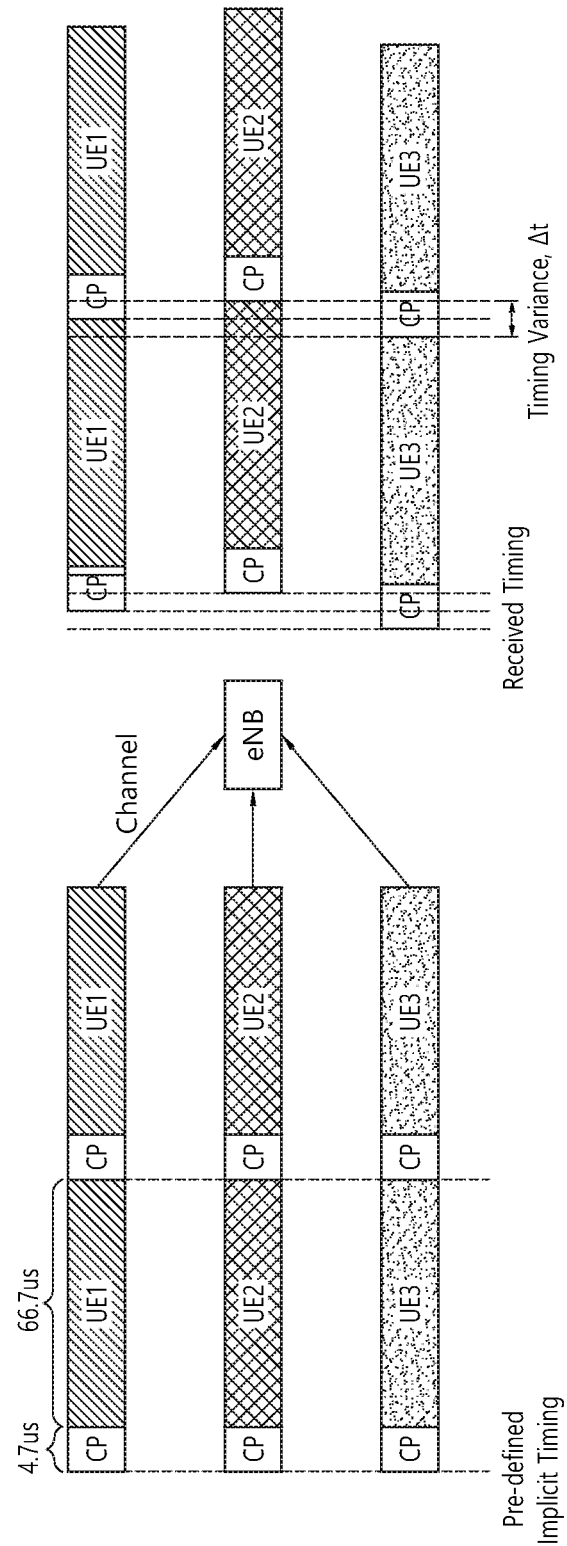
FIG. 13 shows an example of a timing operation of a transceiver through a pre-defined implicit timing scheme.

FIG. 13 shows an example of a timing operation of a transceiver through a pre-defined implicit timing scheme.

Since the pre-defined implicit timing maintains synchronization on a symbol basis, UEs 1, 2, and 3 may ensure symbol synchronization from a transmission perspective even if uplink traffic is generated at different time points as shown in FIG. 13. In this case, each UE may generate an uplink transmission latency of up to $T_{symbol}(=71.4$ us$)$.

In this case, even if the transmission time point is maintained equally as shown in FIG. 13, a receiving eNB performs reception at a different timing according to a physical distance and a multi-path channel experienced by each UE. Therefore, the receiving eNB experiences a timing variance Δt of each UE. Accordingly, there is a need for a method for controlling Δt within a CP duration.

For another example, a user grouping and resource zone allocation scheme for asynchronous control is proposed. This may correspond to a method of controlling a timing offset within a CP from a reception perspective.

Figure 14:
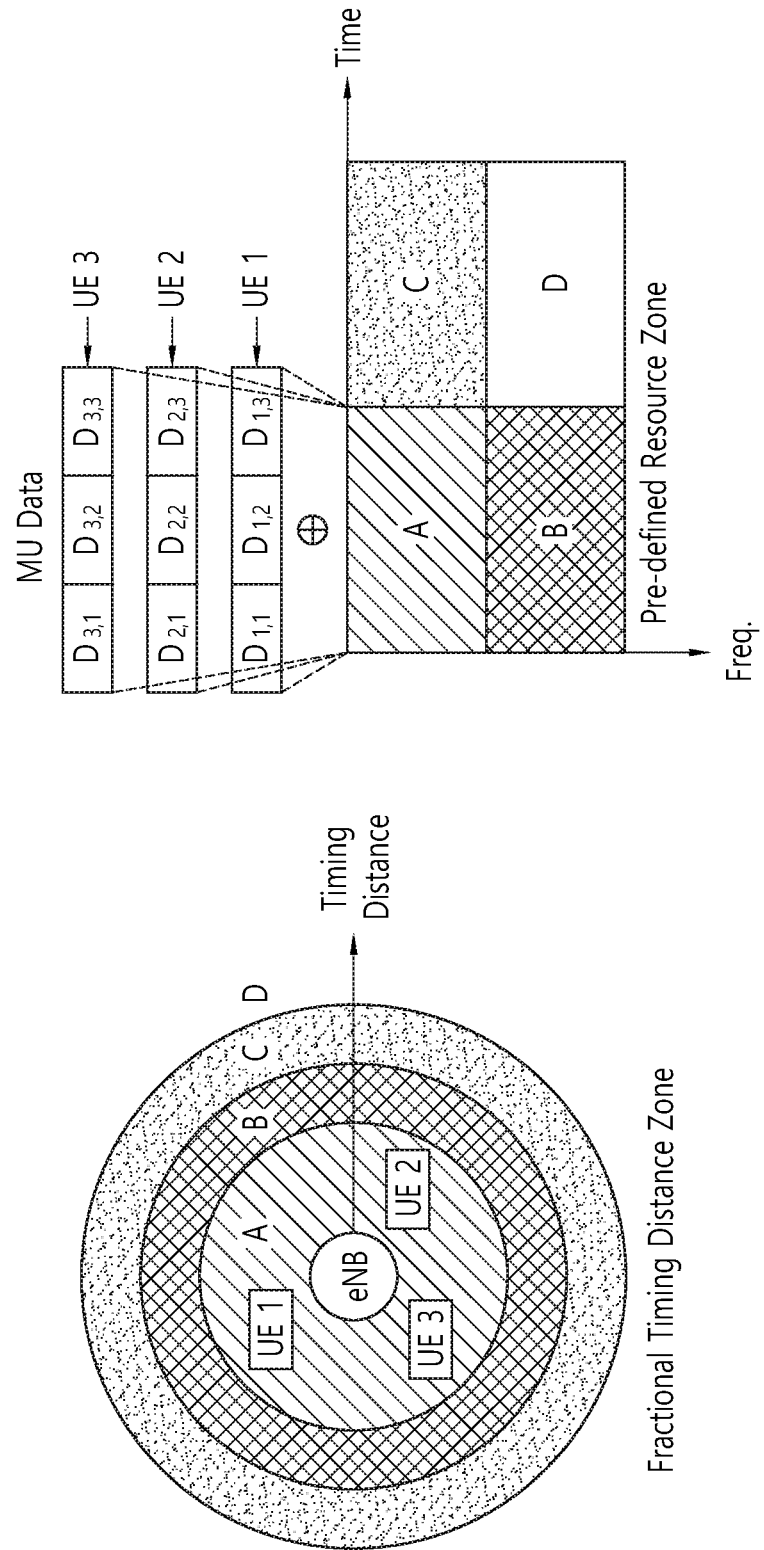
FIG. 14 shows an example of a user grouping and resource zone allocation scheme for asynchronous control.

FIG. 14 shows an example of a user grouping and resource zone allocation scheme for asynchronous control.

Referring to FIG. 14, an eNB receives information regarding a timing distance of a UE periodically or upon downlink transmission or uplink transmission of the UE. Herein, the timing distance is determined by not only a physical distance but also a system environment or a propagation delay caused by a multi-path of the UE. As shown in the left side of FIG. 14, the eNB may configure a fractional timing distance zone and perform user grouping by considering the timing distance between multiple users.

For example, if Δt is controlled with a CP duration, user grouping is performed by assuming that UEs of which a propagation delay time caused by a physical distance or a multi-path corresponds to 0–Δt are in a timing distance zone A. In a similar manner, user grouping is performed by assuming that UEs of which a propagation delay time corresponds to Δt–2*Δt are in a timing distance zone B. Therefore, one user group has a timing offset within a CP duration from a receiving eNB perspective. Herein, the timing variable Δt may be defined variously depending on a system environment (e.g., a cell radius or a CP duration or the like). In this case, as a magnitude of Δt decreases, a timing offset from a reception perspective decreases, whereas a timing distance zone is subdivided and the number of user group increases, which leads to an increase in complexity of a system operation. On the other hand, as the magnitude of Δt increases, a timing offset from a reception perspective increases, whereas simplicity of the timing distance zone and the number of user groups decrease, which leads to a decrease in complexity of the system operation. In addition, when Δt is set beyond CP, the receiving eNB may identify a signal through a rake receiver, and may detect a signal through inverse Fourier transform (IFT) for each individual signal. The user grouping is achieved periodically or upon downlink transmission or uplink transmission of the UE irrespective of immediate uplink data transmission of the UE.

For example, in the left side of FIG. 14, the eNB divides a timing distance zone into four steps A, B, C, and D through information regarding a timing distance of UEs, and allocates the UEs 1, 2, and 3 having similar timing distances to the timing distance zone A. Herein, a scheme of dividing the timing distance zone may control Δt of FIG. 14 within a CP duration. A condition of controlling Δt may vary depending on various carrier spacing and CP configurations. Therefore, when the eNB allocates the same resource zone to UEs allocated to the same timing distance zone, each UE may perform immediate uplink transmission by considering only pre-defined implicit timing irrespective of timing of another user or UL grant/time advance from the eNB. Even if timing of a resource block differs in immediate uplink transmission of each UE, symbol timing within a CP duration may be ensured.

In FIG. 14, the pre-defined resource zone may vary depending on a system environment or the number of users to be connected to the eNB. For example, in FIG. 14, a pre-defined resource zone may be configured according to a fractional timing distance zone, and the pre-defined resource zone may be divided in a time division, frequency division, and time-frequency division manner. Herein, in case of time division, it may be divided variously such as a symbol, a slot, a sub-frame, a frame, or the like, or division may not be achieved. Similarly, in case of frequency division, it may be divided variously such as a sub-carrier, a sub-band, a total-band, or the like, or division may not be achieved. Herein, when it is said that division is not achieved, this means that the entire resources can be used.

In FIG. 14, the UEs 1, 2, and 3 of the same timing distance zone A share the entirety of the same resource zone by performing uplink transmission to the resource zone A. Therefore, since UEs performing uplink transmission in the same resource zone perform uplink transmission with the same resource, a receiving eNB must identify data of the UEs. A multiple access technique capable of multi-user detection (MUD) may be utilized to identify multi-user data. For example, IDMA, SCMA, Power Level NOMA, or the like may be utilized.

Method 2: Time-Frequency Resource Sharing Based on Asynchronous Multiple Access for Ultra-Low Latency In order to achieve the condition 2), each UE must minimize a latency from a UL traffic generation time point to a traffic transmission completion time point. In order to minimize the latency, each UE needs to start data transmission simultaneously with UL traffic generation through as many resources as possible. Accordingly, there is a need for a scheme of performing immediate data transmission without a loss of a decoding rate while multiple users share limited resources.

The present specification proposes a scheme of minimizing immediate data transmission start and traffic transmission completion time points in a multi-user access scheme of sharing limited resources. UEs having different UL transmission requests and traffic sizes perform UL transmission through a multiple access scheme in which MUD is possible, by considering only pre-defined implicit timing mentioned in the method 1. Since users in the resource zone of the method 1 have a timing offset within a CP, UL transmission is performed without considering other users' timing or resource occupation. Then, a receiving eNB performs MUD at a symbol level. The MUD scheme may vary depending on the multiple access scheme, and signals of multiple users are identified through successive interference cancelation (SIC) or parallel interference cancelation (PIC) or the like as an iterative decoding scheme. In addition, a latency from an air interface perspective decreases through a variable configuration of a limited resource zone.

When the proposed method is used, immediate data transmission can be performed without a loss of a decoding rate while multiple users share limited resources.

For example, a UL transmission scheme between multiple UEs on the basis of a frequency spread resource configuration is proposed.

Figure 15:
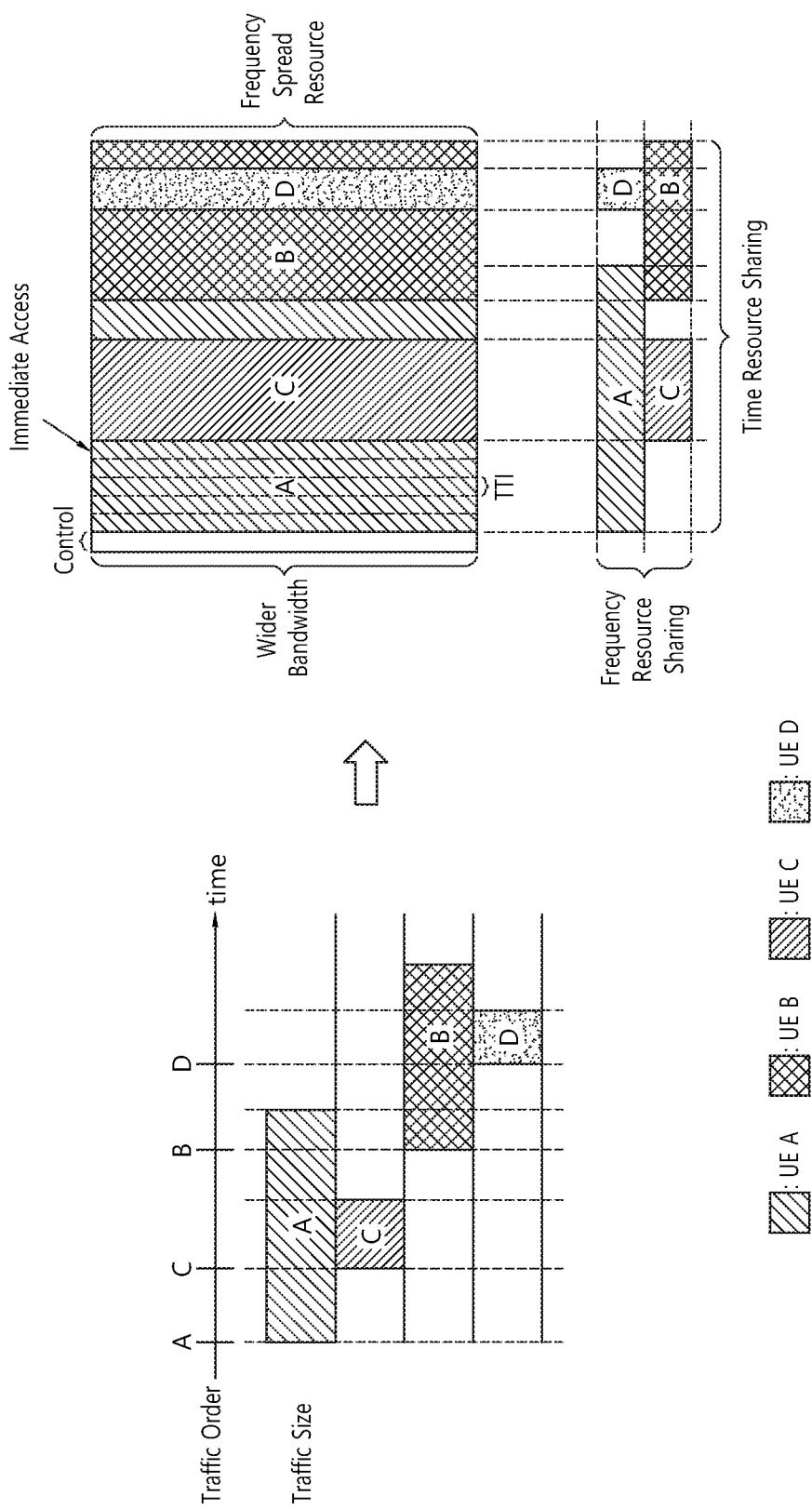
FIG. 15 shows an example of an uplink transmission scheme between multiple UEs on the basis of a frequency spread resource configuration.

FIG. 15 shows an example of an uplink transmission scheme between multiple UEs on the basis of a frequency spread resource configuration.

A UL transmission scheme of multiple UEs for minimizing a traffic transmission completion time point is exemplified in FIG. 15 on the basis of a frequency spread resource configuration. UEs having different UL transmission requests and traffic sizes perform UL transmission through a multiple access scheme in which MUD is possible, by considering only the aforementioned pre-defined implicit timing. For example, when a UE A in which a UL transmission request first occurs performs transmission, a UE C performs UL transmission to the same resource zone. In the same manner, when its transmission request occurs, each UE performs UL transmission without considering other users' timing or resource occupation. Then, a receiving eNB performs MUD at a symbol level. The MUD scheme may vary depending on the multiple access scheme, and signals of multiple users may be identified through successive interference cancelation (SIC) or parallel interference cancelation (PIC) or the like as an iterative decoding scheme.

In the multiple access scheme of the method 2, a resource can be utilized variably since multiple UEs perform UL transmission by sharing the same resource zone. In order to achieve a low latency from an air interface perspective as shown in FIG. 15, an RB or a sub-band may be configured with a smaller transmission time interval (TTI) and a wider sub-carrier or bandwidth. For example, a sub-carrier spacing 15 kHz of a legacy LTE system may be extended, and thus there may be a change in a symbol duration through various sub-carrier configurations such as 30 KHz, 60 KHz, or the like, and even if there is a change in the sub-carrier spacing, it is apparent that the multiple access scheme proposed in the method 2 can be utilized. Likewise, even if various RB units are configured such as 10 RB units, 14 RB units, or the like in 12 sub-carriers, it is apparent that the aforementioned multiple access scheme can be utilized. In a similar manner, the sub-band may also be configured variably.

For example, in FIG. 15, if traffic of the UE A is generated at a time $t_A$ with a traffic amount which can be transmitted during a unit time $T_A$, when scheduling is performed through SC-FDMA or the like of the legacy LTE, a transmission completion time may be expressed such as $t_{ACK}=t_A+t_{control}+T_A/N_{carrier}/N_{symbol}$. Herein, $t_{control}$ is a scheduling control time of TA and grant reception or the like. $N_{carrier}$ and $N_{symbol}$ are frequency and time resources that can be used by the UE A. On the other hand, if the conditions 1) and 2) are achieved according to the multiple access scheme proposed in the methods 1 and 2, the transmission completion time may be expressed such as $t_{ACK}=t_A+t_{Implicit}+T_A/(N_{carrier}*N_{user})/N_{symbol}$. Accordingly, although a traffic generation time $t_A$ is identical, as shown in FIG. 13, it is apparent that $t_{Implicit} \ll t_{control}$. According to the legacy LTE, a maximum value of $t_{Implicit}$ is 71.4 us, and $t_{control}$ is 4-8 ms. In addition, since the UE A can occupy all time frequency resources in the resource zone, the transmission time $T_A$ may be decreased in proportion to the number of occupying UEs. In case of FIG. 15, since the number of occupying UEs is 4, a transmission time can be decreased to $T_A/4$. The aforementioned example may vary depending on variable utilization of resources, and there may be a difference in the time decrease according to a parameter change of a channel coding scheme considering a decoding rate decrease caused by multiple access.

In the proposed frequency spread resource scheme, if the number of UEs which perform simultaneous transmission increases, a decoding rate decreases due to a decrease in MUD performance, and a retransmission request may be performed. Therefore, a level of frequency spread resource needs to be changed adaptively according to the number of UEs to be simultaneously connected. For example, if a maximum value of simultaneous transmission of the multi-user superposition access scheme in use is 4, when simultaneous transmission is performed by four users, a current resource zone is bisected in a frequency domain to enable simultaneous transmission of up to 8 users. The frequency division information is broadcast with an indication bit, and is informed to UEs which use the current resource zone. The UEs continuously perform UL transmission on the basis of the received indication bit.

Method 3: Asynchronous Multiple Access Based Signal Flow for Ultra-Low Latency

A signal flow from a transceiver perspective is required in order to perform the methods 1 and 2.

The present method proposes a signal flow from a transceiver perspective for performing the multi-user access scheme proposed in the methods 1 and 2. A candidate group of a resource zone to be used in UL transmission and control information for multi-user data transmission are previously allocated to each UE by an eNB belonging thereto through pre-defined control information. Each UE transmits an essential control message to the eNB upon generation of UL traffic, and immediately performs data transmission irrespective of UL transmission of another user without any control from the eNB. Upon receiving control information of the eNB without completion of data transmission, data may be transmitted by changing a data transmission scheme according to the received control information.

When the proposed method is used, immediate data transmission is possible without having to wait for control information reception of the eNB upon generation of UL data traffic of the UE.

For example, a signal flow for ULLS is proposed from a single user perspective.

Figure 16:
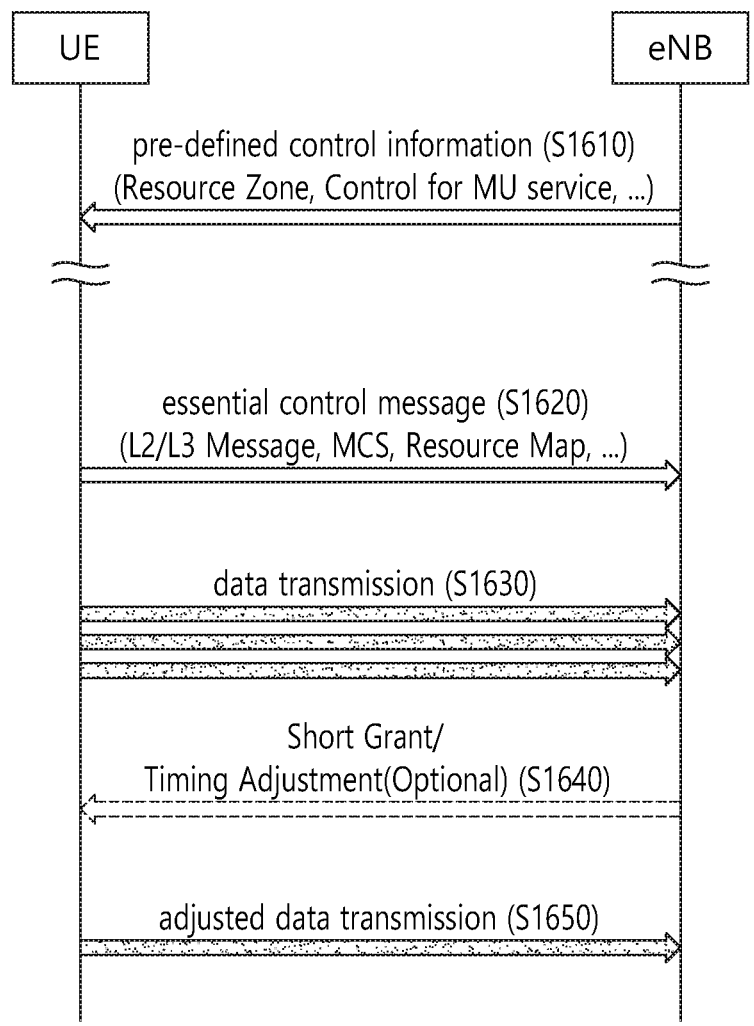
FIG. 16 is a flowchart showing a procedure of transmitting/receiving a signal for ULLS from a single user perspective.

FIG. 16 is a flowchart showing a procedure of transmitting/receiving a signal for ULLS from a single user perspective.

Conditions 1) and 2) for ULLS can be achieved by the methods 1 and 2, and the uplink procedure of FIG. 11 may change as shown in FIG. 16.

In a structure of FIG. 16, a control signaling procedure of the legacy multiple access scheme is simplified, and immediate data transmission of a UE is performed. It is assumed that a candidate group of a resource zone to be used in UL transmission and control information for multi-user data transmission are allocated in advance to each UE by an eNB belonging thereto (S1610). Herein, the resource zone may be allocated based on a timing distance zone as shown in FIG. 14. According to a system environment, a resource allocated for UL transmission may be constructed in a divided manner, or may be constructed as one zone without being divided. When one time-frequency resource is used by multiple users, control information for multi-user data transmission is essential control information of a multiple access scheme for identifying this. For example, there may be a user-specific interleaver scheme or index of IDMA, or a codebook scheme or codeword index of SCMA, a power control scheme or power level of power level NOMA, or the like. Herein, as long-term control information, pre-defined control information or the like of FIG. 12 may be irrelevant to generation of UL information transmission traffic.

Upon generation of traffic of data transmission, each UE transmits only essential control information for network access (S1620), and transmits data immediately without grant reception or timing advance (S1630). As shown in FIG. 16, L2/L3 messages for network access, a modulation and coding scheme (MCS) level previously used, resource map information currently being used, or the like may be included as the essential control information. Transmission of the essential control information is a small amount of information which may affect a decoding rate of subsequent data transmission, and may need to be transmitted by considering repetition or a fixed MCS level capable of ensuring a high decoding rate. In this case, an MCS level or power control of each user is determined autonomously by the UE on the basis of CQI information in a long-term perspective. For example, each user may perform the MCS level and power control on the basis of PDCCH information or DL RSSI information of a previous time. Alternatively, data may be transmitted with a relatively lower level than an MCS level for UL transmission of a previous time and with a higher level than a power level for UL transmission of the previous time, thereby increasing reception reliability.

Regarding an initially determined MCS level and power level, after immediate data transmission, MCS/power level adjustment and synchronization may be performed based on timing advance and a short grant received through a PDCCH during a persistent data transmission time. For example, in FIG. 16, each UE transmits essential control information without scheduling between multiple users upon generation of data transmission traffic (S1620). In addition, data is continuously transmitted without any control of the eNB (S1630). Upon receiving the essential control information, the eNB transmits MCS/power level control information and timing advance information to each UE on the basis of a current UL resource state and timing information (S1640). Each UE which has continuously transmitted data without any control changes an MCS/power level from a time point of receiving control information of the eNB, and continuously transmits data by performing timing advance (S1650). In this case, an indication bit of frequency division may be received for the resource zone of the method 2. Control information transmission/reception of the eNB may be a selective method.

For another example, a signal flow for ULLS is proposed from a multi-user perspective.

Figure 17:
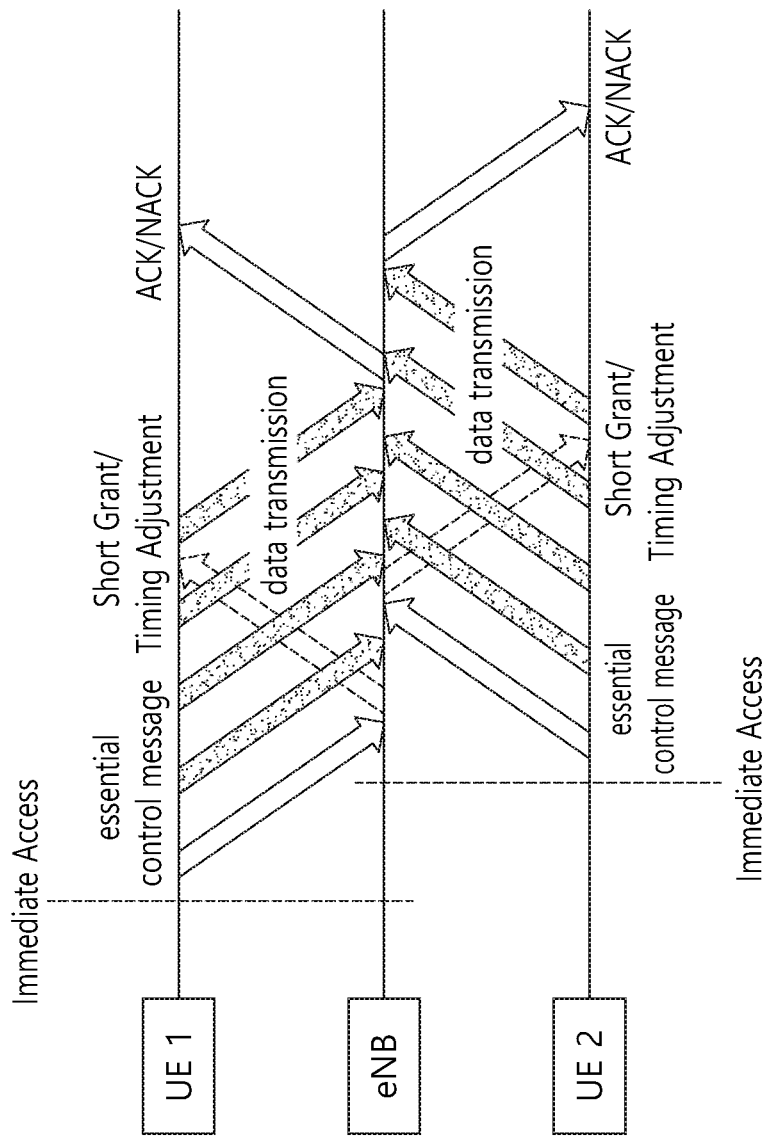
FIG. 17 is a flowchart illustrating a procedure of transmitting/receiving a signal for ULLS from a multi-user perspective.

FIG. 17 is a flowchart illustrating a procedure of transmitting/receiving a signal for ULLS from a multi-user perspective.

Signaling for ULLS based on the multiple access scheme proposed in the method 3 is exemplified in FIG. 17. In a multi-user case, it is apparent that the conditions 1) and 2) can be achieved through the scheme of the method 3, and data transmission can be performed immediately after UL traffic is generated to be robust to an asynchronous property. An eNB persistently decodes data of UEs corresponding to a resource zone, and upon recognizing decoding success or data reception, may perform additional control signaling for maintaining connection with the UE.

Hereinafter, a method of designing a contention zone for contention-based multiple access is described.

A sequence, codeword, or the like described in the present specification refers to a frequency or time-axis complex vector used to classify multiple users in NOMA. The complex vector may have orthogonal or non-orthogonal properties depending on a configuration. In addition, the complex vector may be represented by a single scalar value according to the configuration of the complex vector. In this case, it may be matched with the existing single resource single information transmission. Spreading mentioned in the present specification refers to frequency or time-axis spreading, and the complex vector is used in the spreading. In addition, according to the configuration of the complex vector and a resource allocation scheme, transmission may be achieved with superposition in the same resource region or single transmission may be achieved without superposition.

Figure 18:
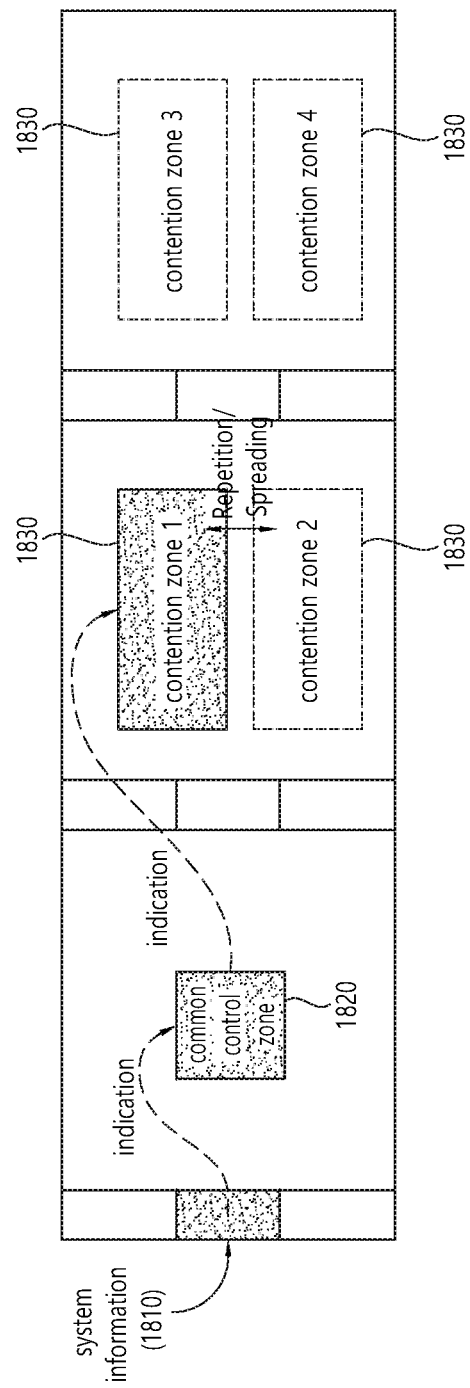
FIG. 18 shows an example of a resource zone for performing contention-based uplink connection and a resource zone for transmitting contention-based uplink data according to an embodiment of the present specification.

FIG. 18 shows an example of a resource zone for performing contention-based uplink connection and a resource zone for transmitting contention-based uplink data according to an embodiment of the present specification.

It is assumed in the present specification that a contention zone 1830 for contention-based UL connection or UL data transmission is broadcast to UEs on the basis of NOMA. For example, the UE performs downlink synchronization through a DL synchronization signal (e.g., PSS and SSS of LTE, a DL synchronization signal proposed in new RAT, or the like). The UE receives system information (system information (SI) 1810, for example, MIB information through PBCH of LTE, SIB in formation through PDSCH, or to-be-broadcast system information proposed in new RAT) on the basis of downlink synchronization. The synchronization signal and the SI 1810 may be broadcast through a common control zone 1820, and all UEs may decode the synchronization signal and the SI 1810.

Through the SI, the UE may recognize a resource region for performing contention-based UL connection and a resource region for performing contention-based UL data transmission. For example, through the SI 1810, a resource index corresponding to the common control zone 1820 may be indicated, or it may be agreed to use a fixed resource in advance. In this case, RNTI (e.g., RNTI for an identification of a contention zone) for decoding the common control zone 1820 may be newly defined, and this is agreed in advance. Through the control information transmitted to the common control zone 1820, a resource index corresponding to the contention zone 1830 may be indicated, or it may be agreed in advance to use a fixed resource. The method may enable transmission also in case of a UE which is not in a connected state, that is, a UE in an idle state. Of course, information on the common control zone may be informed to UEs in the connected state through RRC instead of system information.

In FIG. 18, an x-axis direction is exemplified as a time domain, and a y-axis direction is exemplified as a frequency domain.

A contention zone type may be classified into: 1) a random access zone for UL connection (e.g., a PRACH zone of LTE or a xPRACH zone of new RAT); 2) a scheduling request zone for allocating a UL data transmission region (an SR zone of LTE or an xSR zone of new RAT); 3) a UL control zone for UL control transmission (a PUCCH zone of LTE, or an xPUCCH zone of new RAT); and 4) a UL data zone for UL data transmission (a PUSCH zone of LTE or an xPUSCH zone of new RAT). Herein, it is assumed in the following description that the contention zone is usually used for the case 4).

Hereinafter, a resource region of a contention zone, capability of the contention zone, and multiplexing of the contention zone will be described.

For example, the resource region of the contention zone may be classified into: 1) a single contention zone; 2) multiple contention zones; and 3) a variable contention zone.

1) The single contention zone means that information to be transmitted in a contention based manner is transmitted through one contention zone.

2) The multiple contention zones mean that information to be transmitted on a contention based manner is transmitted by being repeated or spread through two or more contention zones.

Herein, repetition or spreading may be UE-specific. UE specific information may be allocated in advance from the eNB, may be selected in association with UE specific information such as a UE ID, a MAC address, or the like, or may be randomly selected. Multiple contention zones may be subjected to TDM or FDM, and may be multiplexed in combination thereof.

For example, if there is only a contention zone 1 in FIG. 18, it is a single contention zone. If a contention zone 2 is used as multiple contention zones, it is FDM-based multiple contention zones. The contention zones 1 and 2 may transmit information through repetition or spreading in a UE specific manner. Similarly, if a contention zone 3 is used as multiple contention zones, it is TDM-based multiple contention zones. If a contention zone 4 is used as multiple contention zones, it is TDM/FDM-based multiple contention zones. The contention zones 1 and 3 and the contention zones 1 and 4 may transmit information through repetition or spreading in a UE specific manner.

The multiple contention zones may be selectively used based on a UE-specific pattern. For example, a UE 1 may transmit information on the basis of repetition or spreading to the contention zones 1 and 2 among the contention zones 1 to 4, and a UE 2 may transmit information on the basis of repetition or spreading to the contention zones 2 and 4. In this case, since superposition reception is achieved only in the contention zone 2, a detection success rate for multiuser information can be increased in an eNB served as a receiver. That is, in case of a UE which cannot achieve coverage only with a single contention zone, data needs to be transmitted to multiple contention zones by achieving an SNR gain through repetition or spreading in a time domain. The gain through the operation above means that collision for multiple contention zones occurs partially to have a gain in log-likelihood ratio (LLR) calculation in the combining of the receiver. That is, in the example above, since the UE 1 and the UE 2 perform superposition transmission only in the contention zone 2 among the contention zones 1 to 4, the eNB may obtain the gain of the LLR calculation when combining and receiving transmission information of the UE 1 and the UE 2. In addition, repetition or spreading to a frequency domain may result in obtaining frequency diversity, thereby improving reliability.

A pattern level for selection of the contention zone is exemplified as follows. Herein, regarding the contention zone, it is assumed that four contention zones (contention zones 1 to 4) exist in a specific period.

Pattern level 1: Single Contention Zone

Pattern n=Zone n (for n=1, . . . , 4)

Users of a UE class capable of achieving UL coverage only with a single contention zone select a pattern corresponding to the pattern level 1.

Pattern Level 2: Multiple Contention Zones

Pattern 1 (=Zone 1+Zone 2) or Pattern 2 (=Zone 3+Zone 4)

Users of a UE class which requires an increase in reliability of UL data on the basis of frequency diversity select a pattern 1 or 2 of the pattern level. In this case, in two contention zones, the same UL data may be repeated, or spreading or low code rate transmission may be performed. The operation above may be pre-defined through offline or RRC signaling or higher layer signal transmission, or may be periodically broadcast through common control signaling of an eNB.

Pattern 3 (=Zone 1+Zone 3) or Pattern 4 (=Zone 2+Zone 4)

Users of a UE class which cannot achieve UL coverage only with a single contention zone select a pattern 3 or 4 of the pattern level 2, for SNR gathering. In this case, in two contention zones, the same UL data may be repeated, or spreading or low code rate transmission may be performed.

Pattern 5 (=Zone 1+Zone 4) or Pattern 6 (=Zone 2+Zone 3)

Users of a UE class which cannot achieve UL coverage only with a single contention zone select a pattern 5 or 6 of the pattern level 2 to simultaneously obtain SNR gathering and frequency diversity. In this case, in two contention zones, the same UL data may be repeated, or spreading or low code rate transmission may be performed.

The example above is summarized as shown in Table 3 below. Herein, it is assumed that four contention zones exist in a specific period, and the UE class is classified into 4 cases. The UE class may correspond to a UE group which performs contention-based transmission on the basis of a specific pattern.

TABLE 3

| Pattern Level | Pattern Index | Contention Zone | UE Class |
|---|---|---|---|
| Pattern Level 1 | 1 | 1 | 1 (Single Contention Zone Class) |
| | 2 | 2 | 1 (Single Contention Zone Class) |
| | 3 | 3 | 1 (Single Contention Zone Class) |
| | 4 | 4 | 1 (Single Contention Zone Class) |
| Pattern Level 2 | 1 | 1, 2 | 2 (Frequency Diversity Class) |
| | 2 | 3, 4 | 2 (Frequency Diversity Class) |
| | 3 | 1, 3 | 3 (SNR Gathering Class) |
| | 4 | 2, 4 | 3 (SNR Gathering Class) |

TABLE 3-continued

| Pattern Level | Pattern Index | Contention Zone | UE Class |
|---|---|---|---|
| | 5 | 1, 4 | 4 (Frequency Diversity w/ SNR Gathering Class) |
| | 6 | 2, 3 | 4 (Frequency Diversity w/ SNR Gathering Class) |

The pattern level and pattern index of Table 3 are selected by the UE class. A corresponding pattern level and pattern information may be agreed in advance through common control signaling of an eNB, RRC signaling, higher layer signaling, or offline.

Figure 19:
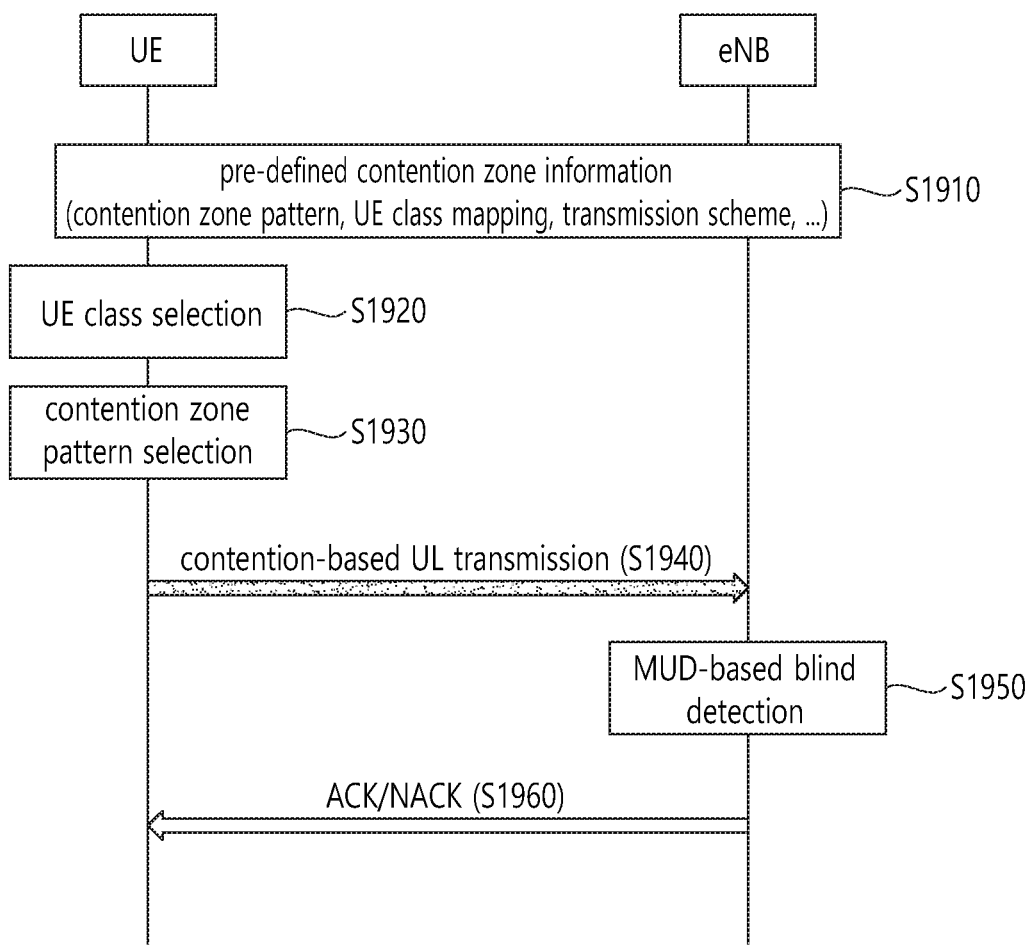
FIG. 19 is a flowchart showing a procedure of performing contention-based uplink transmission by using a resource zone according to an embodiment of the present specification.

FIG. 19 is a flowchart showing a procedure of performing contention-based uplink transmission by using a resource zone according to an embodiment of the present specification.

First, a UE receives pre-defined contention zone information from an eNB (S1910). However, since the eNB broadcasts the pre-defined contention zone information, all UEs in a cell receives this. The pre-defined contention zone information includes information regarding the contention zone pattern, UE class, and transmission scheme described in Table 3 above. The transmission scheme indicates whether the contention zone is transmitted through repetition or spreading. That is, a pattern level, pattern index, and UE class of the contention zone of Table 3 are agreed in advance between the UE and the eNB.

The UE selects a UE class to be used by the UE from the UE classes of Table 3 (S1920). The UE may select the UE class according to whether the UE requires SNR gathering or frequency diversity.

In addition, the UE selects a contention zone pattern according to the selected UE class (S1930). The UE performs contention-based UL data transmission through the selected contention zone (S1940).

In this case, a receiver (eNB) may not know which UE will correspond to which UE class since the pre-defined contention zone information has been broadcast. It may be assumed that the eNB performs blind detection for each pattern or that UL control linkage is possible for a UE specific preamble or a UE identification. That is, for example, the eNB needs to perform blind detection on 4 contention zones (patterns) for a pattern level 1 and perform blind detection on 5 patterns for a pattern level 2. That is, the eNB may perform multi-user detection (MUD) to detect data transmitted by the UE (S1950).

If the eNB has successfully detected UL data of the UE through the multi-user detection, ACK/NACK may be transmitted (S1960).

Alternatively, unlike in the aforementioned procedure, the eNB may recognize the UE class in an RRC step, and may designate a pattern for the use of the contention zone. In this case, the eNB may directly signal the contention zone usage pattern based on the UE class through RRC signaling or higher layer signaling, and when traffic is generated according to an instruction, the UE may perform contention-based data transmission by using a designated pattern.

For another example, the UE may select a contention zone or a contention zone usage pattern on the basis of UE specific information such as C-RNTI or the like. For example, when there are contention zones 1 to 4 which can be selected by a $k^{th}$ UE, selecting of a single contention zone may be defined by the following equation.

Contention Zone Index $(k)$=mod(C-RNTI $(k)$, Maximum Contention Zone Index)+1

That is, in the example above, when the $k^{th}$ UE has 5 as UE-ID information such as C-RNTI or the like, a maximum contention zone index is 4. Therefore, information of Contention Zone Index $(k)$=2 may be acquired and used through a modulo operation.

In addition, when there are contention zones 1 to 4 which can be selected by the $k^{th}$ UE, selecting of multiple single contention zones may be defined by the following equation.

Contention Zone Indices $(k)$={mod(C-RNTI $(k)$, Maximum Contention Zone Index)+1, mod(C-RNTI $(k)$, Maximum Contention Zone Index/$N\_c$)+1+$N\_c$}

Herein, $N\_c$ is the number of contention zones which are simultaneously selected by the UE. That is, if $N\_c$=2 in the example above, when the $k^{th}$ UE has 5 as UE-ID information such as C-RNTI or the like, a maximum contention zone index is 4. Therefore, information of Contention Zone Indices $(k)$={2, 4} may be acquired and used through a modulo operation.

3) The variable contention zone means that a location and count of a resource region of the contention zone varies depending on a system environment.

A method in which the eNB determines whether collision occurs between the UEs is as follows. The eNB may verify a reference signal (DMRS) through measurement of strength (energy) or the like of a received signal. The eNB may estimate a channel through the reference signal and may perform cyclical redundancy check (CRC) by receiving data. In this case, if a CRC error occurs, since data decoding has an error in the presence of a connected user, it may be verified that collision occurs by multiple users. Accordingly, the eNB may verify a collision ratio of the contention zone.

The eNB changes the location, count, and period of the contention zone on the basis of a statistical feature of a system, a collision ratio of the contention zone, a multiuser detection success rate, or the like, and broadcasts the changed information through the system information or the common control zone.

For example, for optimal resource allocation between a resource region for scheduling-based data transmission and a resource region for contention-based data transmission, the contention zone may change in location. Therefore, the changed location information is broadcast through the system information or the common control zone. In addition, in an environment where the number of attempts to perform contention-based information transmission is great, a collision ratio is high, or a multi-user detection success rate is low, a success rate of contention-based information transmission can be increased by more securing the number of contention zones. As a method of increasing the number of contention zones, there is a method of increasing a success rate by using a pattern or the like which is repeated or spread through the multiple contention zones mentioned above in the section 2), or a contention zone is managed more frequently through a smaller period of a single contention zone. The single contention zone or the multiple contention zones may be informed based on indexing for time/frequency of a resource, or may be informed by indexing periodicity information on the basis of a reference location. For example, as shown in FIG. 20 to FIG. 22, there may be 5 density patterns of the contention zone.

Figure 20:
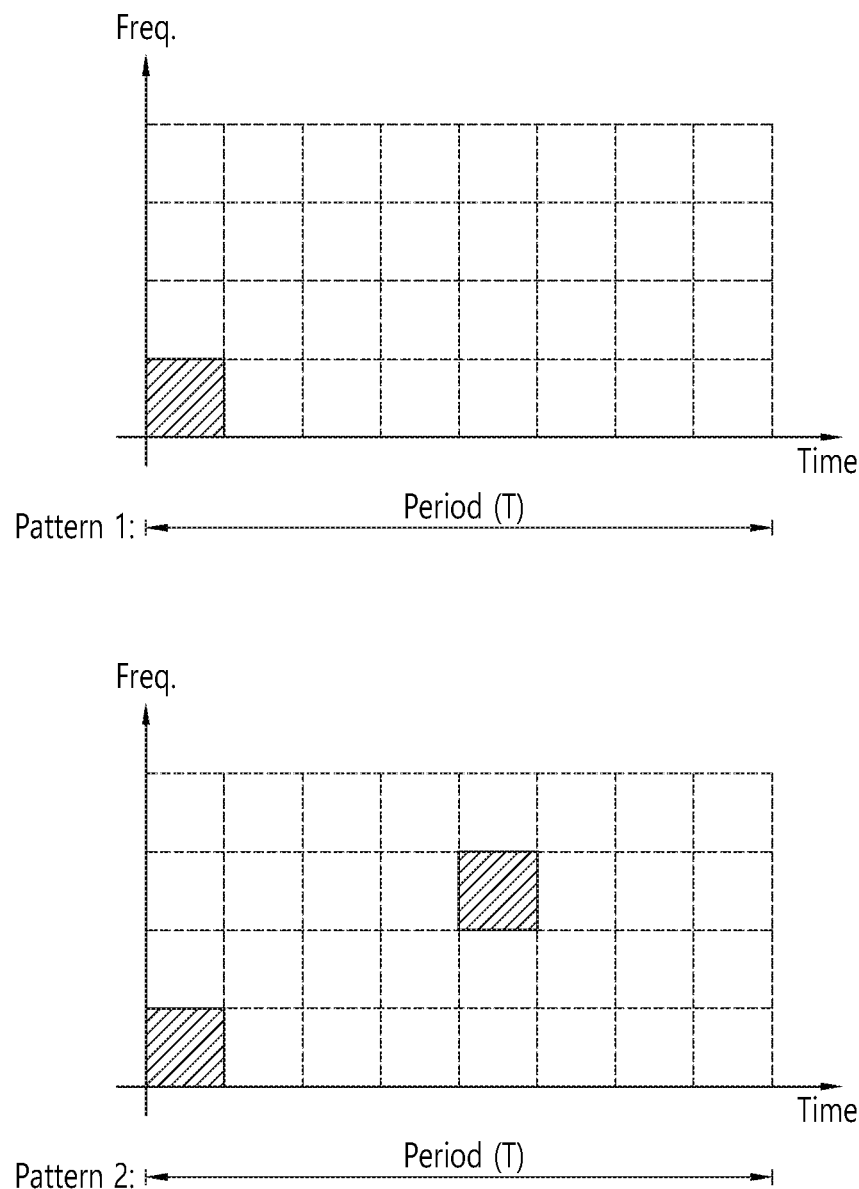
FIG. 20 shows an example of a density pattern of a contention zone according to an embodiment of the present specification.

FIG. 20 shows an example of a density pattern of a contention zone according to an embodiment of the present specification.

A pattern 1 of FIG. 20 may be a reference location of a contention zone. An eNB may inform a pattern 2 of FIG. 20 by indexing periodicity information on the basis of the pattern 1 of FIG. 20. In FIG. 20, a normal zone may be a resource region for scheduling-based data transmission. As a pattern index is increased to patterns 2, 3, 4, and 5, the resource region for scheduling-based data transmission decreases, and the resource region for contention-based data transmission increases.

Figure 21:
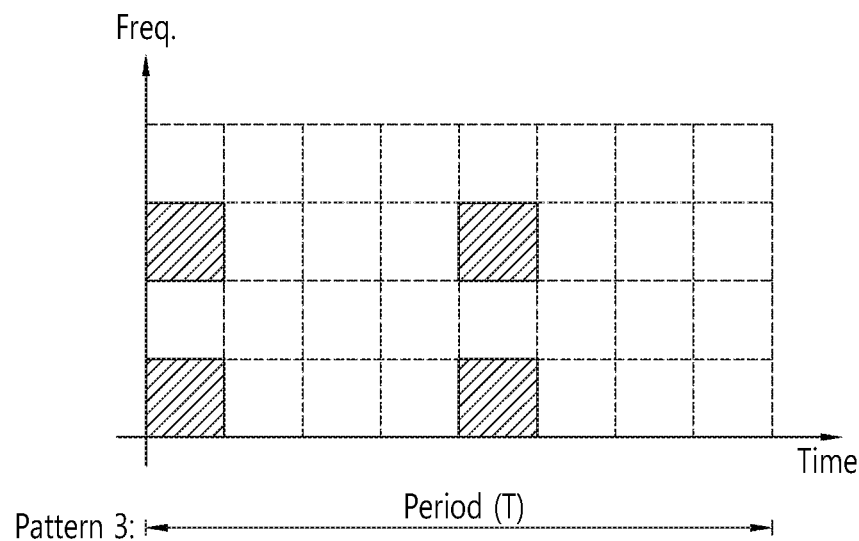
FIG. 21 shows another example of a density pattern of a contention zone according to an embodiment of the present specification.
Figure 21:
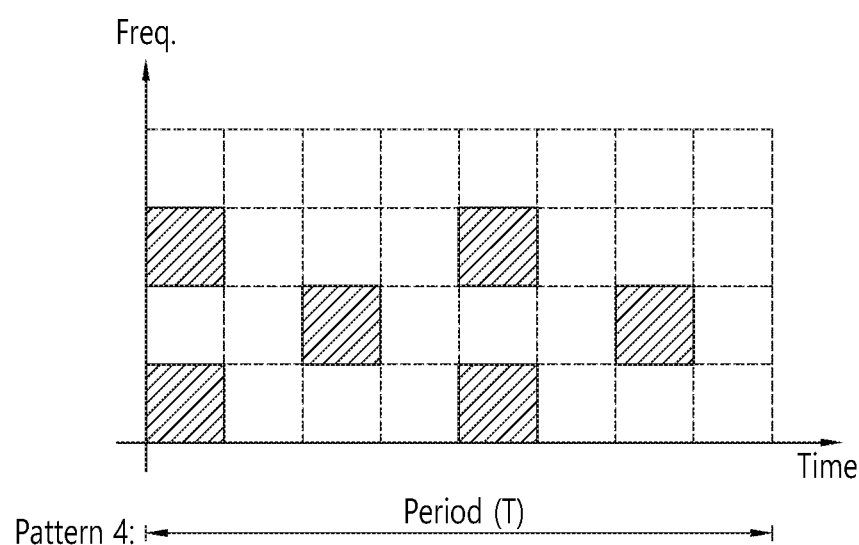
Figure 22:
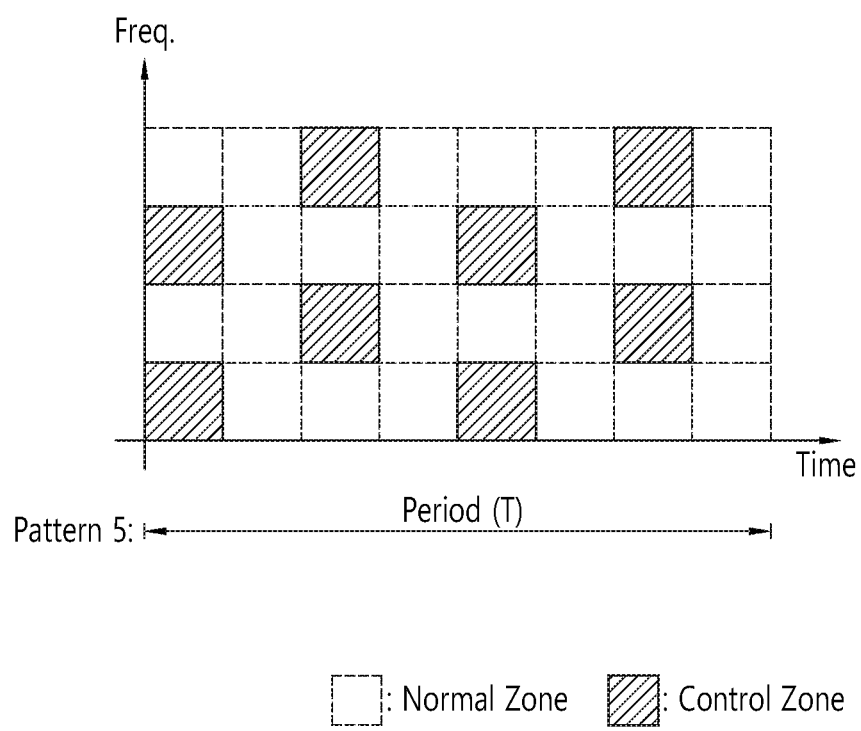
FIG. 22 shows another example of a density pattern of a contention zone according to an embodiment of the present specification.

FIG. 21 shows another example of a density pattern of a contention zone according to an embodiment of the present specification.

An eNB may inform patterns 3 and 4 of FIG. 21 by indexing periodicity information on the basis of the pattern 1 of FIG. 20.

FIG. 22 shows another example of a density pattern of a contention zone according to an embodiment of the present specification.

An eNB may inform a pattern 5 of FIG. 22 by indexing periodicity information on the basis of a pattern 1 of FIG. 20.

The entire density pattern information (density patterns 1 to 5) of the contention zone may be agreed in advance by using a method pre-defined through common control signaling of the eNB, RRC signaling, higher layer signaling, or offline. In addition, density pattern information which changes dynamically by a system environment may be broadcast through common control signaling of the eNB, RRC signaling, higher layer signaling, or the like.

For another example, capability of the contention zone may be classified into: 1) fixed capability; and 2) variable capability.

1) A fixed capability contention zone means to always have fixed capability for a single contention zone. For example, capability of the contention zone is set based on performance of a worst case in order to provide reliability of a contention-based information transmission success rate. Herein, the capability includes a sequence or codeword which provides the maximum number of contention zones to be supported, the number of resources, or the like, and may vary depending on a system environment. In the method above, the fixing of the capability does not always mean to fix the transmission success rate.

2) A variable capability contention zone means to have flexible capability for a single contention zone. For example, since a required contention-based information transmission success rate may vary depending on a service scenario (e.g., mMTC, URLLC, eMBB, eV2X, etc.), the capability of the contention zone may vary. Information regarding the contention zone based thereon is broadcast. In addition, by considering a tradeoff between resource allocation and optimal reliability based on an increase/decrease in the number of attempts for contention-based contention or UL data transmission, capability of a single contention zone is controlled, and information of the contention zone is broadcast. Herein, the capability includes a sequence or codeword which provides the maximum number of contention zones to be supported, the number of resources, or the like, and may vary depending on a system environment.

In addition, a threshold for determining capability may be defined according to a system environment, a service scenario, or the like (Threshold=function(Reliability, # of Connections, # of Resources, Tx/Rx Complexity, . . . )). Optimal capability may be defined according to a Cell-specific/Service-specific/Zone-specific/UE-specific Threshold. The information may be broadcast through system information or the common control zone, and may be broadcast statically through any physical channel. In the method above, control of the capability does not always mean control of a transmission success rate. For example, when the capability is defined as the number of codewords, it may be exemplified as shown in Table 4 below.

TABLE 4

| Capability field of Contention Zone 'x' | Capability Level | Codebook Index (the maximum number of Codewords) |
| --- | --- | --- |
| 00 | 1 | 1 (max. codeword index = 4) |
| 01 | 2 | 2 (max. codeword index = 6) |
| 10 | 3 | 3 (max. codeword index = 8) |
| 11 | 4 | 4 (max. codeword index = 12) |

According to Table 4 above, if a capability field for a contention zone 'x' is transmitted through a common control channel or a broadcasting channel or the like, the UE recognizes a codebook which can be used by the UE, by referring to a look up table for the capability level of Table 4 above. Herein, in the codebook, the maximum number of selectable codewords may vary depending on an index. When the number of codewords is great, the number of cases which can be selected by the UE increases, and thus a collision ratio may decrease. For example, when a probability of collision occurrence is low, the number of codewords is not necessarily great. Therefore, the UE may select an available codeword from among four codewords for the codebook index 1 of Table 4 above. Unlike this, when the probability of collision occurrence is high, the number of codewords needs to be great. Therefore, the UE may select an available codeword from among 12 codewords for the codebook index 4 of Table 4 above.

For another example, multiplexing of the contention zone may be classified into: 1) TDM; 2) FDM; and 3) CDM.

1) The contention zone may be subjected to time division multiplexing (TDM) according to a target service scenario. To utilize the contention zone in unit of a resource block, the TDM may be performed based on frequency spreading to satisfy a latency requirement. In the contention zone, multi-user access may be achieved by using NOMA or OMA based on spreading.

2) The contention zone may be subjected to frequency division multiplexing (FDM) according to a target service scenario. To utilize the contention zone in unit of a resource block, the FDM may be performed based on time spreading according to a short packet property. In the contention zone, multi-user access may be achieved by using NOMA or OMA based on spreading.

3) The contention zone may be subjected to coding division multiplexing (CDM) according to a target service scenario.

3-1) In order to utilize the contention zone in unit of the resource block, multi-user access may be achieved based on 2D spreading (time/frequency spreading) in unit of the contention zone.

3-2) The contention zone may differ in a level of superposition in the same contention zone.

Herein, it may be classified into that: 3-2-1) there is a difference in a superposition level on the basis of NOMA for each resource in the same contention zone; and 3-2-2) there is a difference in a superposition level of each contention zone. For example, regarding the difference in the superposition level of each contention zone, contention may be allowed based on an orthogonal sequence or codeword in case of a contention zone 1, and contention may be allowed based on a non-orthogonal sequence or codeword in case of an independent contention zone 2. 3-2-3) The orthogonal sequence and the non-orthogonal sequence may be simultaneously superposed in the same contention zone. For example, when a non-orthogonal sequence set includes an orthogonal sequence set as a superset, the orthogonal sequence and the non-orthogonal sequence may be superposed on the same sequence, and multi-user detection (MUD) performance of a receiver may vary depending on the superposition level of the contention-based information transmission.

Figure 23:
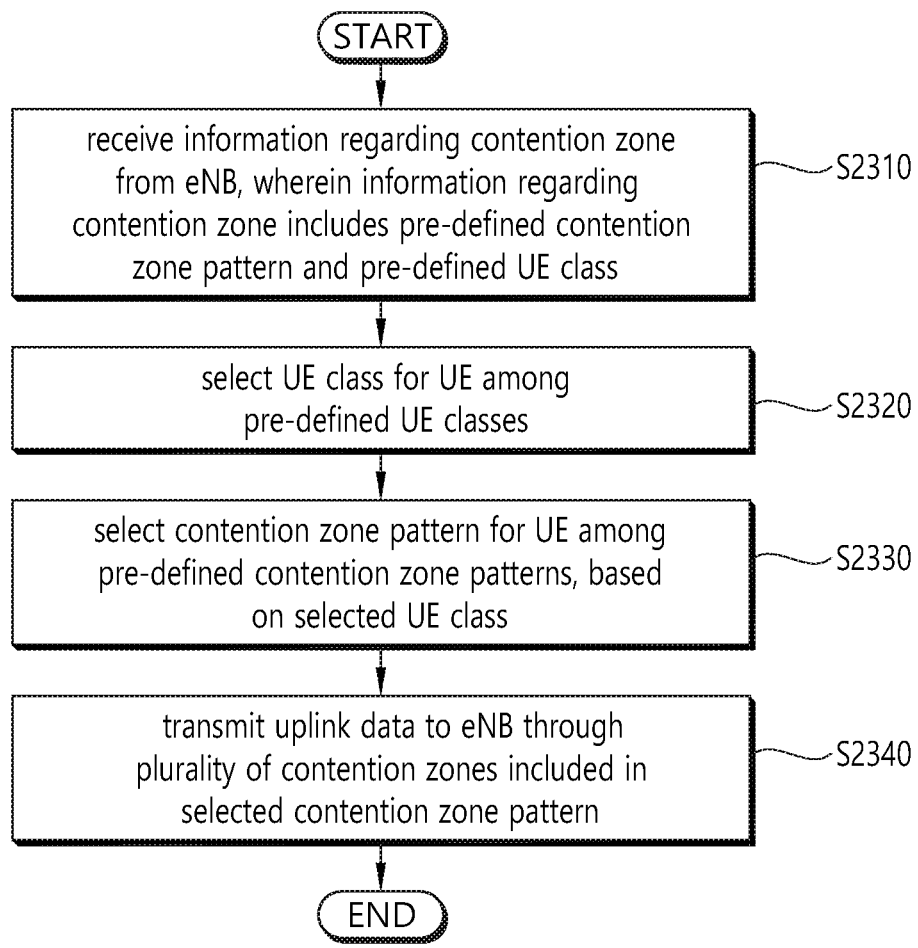
FIG. 23 is a flowchart showing a procedure of transmitting contention-based uplink data by using a resource zone according to an embodiment of the present specification.

FIG. 23 is a flowchart showing a procedure of transmitting contention-based uplink data by using a resource zone according to an embodiment of the present specification.

The present embodiment shows uplink communication between an eNB and a specific UE in a wireless communication system to which a non-orthogonal multiple access scheme is applied.

First, terminologies will be summarized. A contention zone may correspond to a resource region for contention-based uplink connection or uplink data transmission on the basis of orthogonal or non-orthogonal multiple access.

In step S2310, the UE receives information regarding a contention zone from the eNB. The information regarding the contention zone includes a pre-defined contention zone pattern and a pre-defined UE class.

The pre-defined contention zone pattern and the pre-defined UE class may be agreed in advance between the eNB and the UE. The pre-defined contention zone pattern and the pre-defined UE class are broadcast to all UEs in a cell in a look up table form. Upon receiving the information, the UE attempts to perform non-orthogonal multiple access to the eNB.

The pre-defined contention zone pattern may be selected based on the pre-defined UE class. The UE class may correspond to a UE group which performs contention-based transmission on the basis of a specific pattern for the contention zone. Therefore, the UE class and the contention zone pattern may be related to each other. In addition, the pre-defined contention zone pattern may be signaled through a common control zone, a radio resource control (RRC), or a higher layer.

In step S2320, the UE selects a UE class for the UE from among the pre-defined UE classes. That is, the UE selects a specific UE class from among the pre-defined UE classes by considering whether the UE requires SNR gathering or requires to obtain frequency diversity.

In step S2330, the UE selects the contention zone pattern for the UE from among the pre-defined contention zone patterns on the basis of the selected UE class. For example, if the UE has selected the UE class for SNR gathering, the UE selects a pattern including a contention zone repeated or spread in a time domain to obtain an SNR gain. In addition, if the UE has selected the UE class to obtain frequency diversity, the UE selects a pattern including a contention zone repeated or spread in a frequency domain.

In step S2340, the UE transmits uplink data to the eNB through a plurality of contention zones included in the selected contention zone pattern.

The contention zone includes a single contention zone which uses only one contention zone, multiple contention zones (a plurality of contention zones) which use two or more contention zones, or a variable contention zone in which a location and count of the contention zone varies. Herein, however, it is assumed that a contention-based procedure is performed by using the multiple contention zones. The multiple contention zones mean that information to be transmitted on a contention based manner is transmitted by being repeated or spread through two or more contention zones.

In other words, the plurality of contention zones may be generated by allowing one contention zone included in the selected contention zone pattern to be repeated or spread in a frequency domain. Alternatively, the plurality of contention zones may be generated by allowing one contention zone included in the selected contention zone pattern to be repeated or spread in a time domain.

In addition, if reliability of uplink data cannot be secured with one contention zone included in the selected contention zone pattern, the uplink data may be transmitted through the plurality of contention zones. That is, if the UE cannot achieve UL coverage only with the single contention zone, the UE may transmit contention-based data by using the plurality of contention zones.

In addition, the UE may receive system information indicating the common control zone from the eNB. The system information and information regarding the contention zone may be received through the common control zone. That is, the system information may also be broadcast to all UEs in a cell.

In addition, it may be assumed that the UE and the eNB perform a contention-based procedure by using the variable contention zone. In this case, a location, count, and period of the contention zone may be changed depending on a success rate of multi-user detection (MUD) and a collision ratio of a contention zone included in the pre-defined contention zone pattern. The location, count, and period of the changed contention zone may be broadcast through the common control zone.

In addition, capability of the contention zone may be considered. The capability of the contention zone included in the pre-defined contention zone pattern may indicate the maximum number of pre-defined codewords. The capability of the contention zone may be broadcast through the common control zone. The maximum number of pre-defined codewords may vary depending on a collision ratio of the contention zone. In this case, the UE may randomly select a codeword for the UE from among the pre-defined codewords.

Information on the capability of the contention zone (capability field, capability level, and codebook index) may be broadcast in a look up table form, and the UE may recognize a codebook which can be used by the UE. When the number of codewords is great, the number of cases which can be selected by the UE increases, and thus a collision ratio may decrease.

For example, when a probability of collision occurrence is low, the number of codewords needs to be decreased to reduce an amount of interference which occurs between codewords. Therefore, the UE may select a codeword from among codebook indices of which the maximum number of selectable codewords is small. When the probability of collision occurrence is high, the number of required codewords is great. Therefore, the UE may select a codeword from among codebook indices of which the maximum number of selectable codewords is great.

In addition, the plurality of contention zones may be subjected to code division multiplexing (CDM) in the same contention zone. The plurality of contention zones may be subjected to multi-user access by using not only time division multiplexing and frequency division multiplexing but also code division multiplexing.

Figure 24:
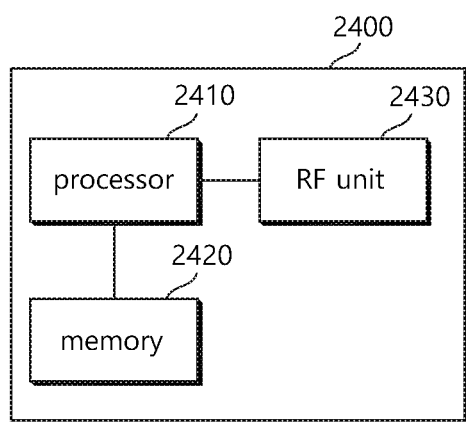
FIG. 24 is a block diagram showing an apparatus for wireless communication for implementing an embodiment of the present invention.

FIG. 24 is a block diagram showing an apparatus for wireless communication for implementing an embodiment of the present invention.

An apparatus 2400 for wireless communication includes a processor 2410, a memory 2420 and a radio frequency (RF) unit 2430.

The processor 2410 may be configured to implement proposed functions, procedures and/or methods described in this description. Layers of the radio interface protocol may be implemented in the processor 2410. The processor 2410 may handle a procedure explained above. The memory 2420 is operatively coupled with the processor 2410, and the RF unit 2430 is operatively coupled with the processor 2410.

The processor 2410 may include application-specific integrated circuit (ASIC), other chipset, logic circuit and/or data processing device. The memory 2420 may include read-only memory (ROM), random access memory (RAM), flash memory, memory card, storage medium and/or other storage device. The RF unit 2430 may include baseband circuitry to process radio frequency signals. When the embodiments are implemented in software, the techniques described herein can be implemented with modules (e.g., procedures, functions, and so on) that perform the functions described herein. The modules can be stored in memory 2420 and executed by processor 2410. The memory 2420 can be implemented within the processor 2410 or external to the processor 2410 in which case those can be communicatively coupled to the processor 2410 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method by a user equipment (UE) in a wireless communication system to which a non-orthogonal multiple access scheme is applied, the method comprising:
   receiving, from a base station, information regarding a contention zone,
   wherein the information regarding the contention zone includes a pre-defined contention zone pattern and a pre-defined UE class;
   selecting a UE class for signal to noise ratio (SNR) gathering or frequency diversity among the pre-defined UE classes;
   selecting a contention zone pattern among the pre-defined contention zone patterns,
   wherein the contention zone pattern is selected as a first pattern including a contention zone repeated or spread in a time domain based on the selected UE class being for the SNR gathering, and
   wherein the contention zone pattern is selected as a second pattern including a contention zone repeated or spread in a frequency domain based on the selected UE class being for the frequency diversity;
   transmitting uplink data to the base station through a plurality of contention zones included in the selected contention zone pattern.

2. The method of claim 1, wherein the uplink data is transmitted through the plurality of contention zones if reliability of the uplink data cannot be secured with one contention zone included in the selected contention zone pattern.

3. The method of claim 1,
   wherein the pre-defined contention zone pattern is selected based on the pre-defined UE class, and
   wherein the pre-defined contention zone pattern is signaled through a common control zone, a radio resource control (RRC), or a higher layer.

4. The method of claim 3, further comprising
   receiving system information indicating the common control zone from the base station,
   wherein the system information and information regarding the contention zone are received through the common control zone.

5. The method of claim 4,
   wherein a location, count, and period of the contention zone are changed based on a success rate of multi-user detection (MUD) and a collision ratio of a contention zone included in the pre-defined contention zone pattern, and
   wherein the location, count, and period of the changed contention zone is broadcast through the common control zone.

6. The method of claim 4,
   wherein capability of the contention zone included in the pre-defined contention zone pattern indicates the maximum number of pre-defined codewords,
   wherein the capability of the contention zone is broadcast through the common control zone,
   wherein the maximum number of pre-defined codewords varies based on a collision ratio of the contention zone, and
   wherein a codeword for the UE is randomly selected from among the pre-defined codewords.

7. A UE in a wireless communication system to which a non-orthogonal multiple access scheme is applied, the UE comprising:
   a transceiver transmitting and receiving a radio signal; and
   a processor operatively coupled to the transceiver, wherein the processor is configured to:
   receive, from a base station, information regarding a contention zone,
   wherein the information regarding the contention zone includes a pre-defined contention zone pattern and a pre-defined UE class;
   select a UE class signal to noise ratio (SNR) gathering or frequency diversity among the pre-defined UE classes;
   select a contention zone pattern among the pre-defined contention zone patterns,
   wherein the contention zone pattern is selected as a first pattern including a contention zone repeated or spread in a time domain based on the selected UE class being for the SNR gathering, and
   wherein the contention zone pattern is selected as a second pattern including a contention zone repeated or spread in a frequency domain based on the selected UE class being for the frequency diversity; and transmit uplink data to the base station through a plurality of contention zones included in the selected contention zone pattern.

8. The UE of claim 7, wherein the uplink data is transmitted through the plurality of contention zones if reliability of the uplink data cannot be secured with one contention zone included in the selected contention zone pattern.

9. The UE of claim 7,
wherein the pre-defined contention zone pattern is selected based on the pre-defined UE class, and
wherein the pre-defined contention zone pattern is signaled through a common control zone, a radio resource control (RRC), or a higher layer.

10. The UE of claim 9,
wherein the processor receives system information indicating the common control zone from the base station, and
wherein the system information and information regarding the contention zone are received through the common control zone.

11. The UE of claim 10,
wherein a location, count, and period of the contention zone are changed based on a success rate of multi-user detection (MUD) and a collision ratio of a contention zone included in the pre-defined contention zone pattern, and
wherein the location, count, and period of the changed contention zone is broadcast through the common control zone.

12. The UE of claim 10,
wherein capability of the contention zone included in the pre-defined contention zone pattern indicates the maximum number of pre-defined codewords,
wherein the capability of the contention zone is broadcast through the common control zone,
wherein the maximum number of pre-defined codewords varies based on a collision ratio of the contention zone, and
wherein a codeword for the UE is randomly selected from among the pre-defined codewords.

* * * * *